United States Patent [19]
Kay

[11] Patent Number: 6,134,233
[45] Date of Patent: Oct. 17, 2000

[54] APPARATUS AND METHOD OF FRAME ALIGNING INFORMATION IN A WIRELESS TELECOMMUNICATIONS SYSTEM

[75] Inventor: David L. Kay, London, United Kingdom

[73] Assignee: Airspan Networks, Inc., Seattle, Wash.

[21] Appl. No.: 08/968,992

[22] Filed: Nov. 12, 1997

[30] Foreign Application Priority Data

Dec. 18, 1996 [GB] United Kingdom .................... 9626304

[51] Int. Cl.$^7$ ...................................................... H04J 3/06
[52] U.S. Cl. ............................ 370/350; 370/506; 370/509
[58] Field of Search ..................................... 370/503, 509,
370/510, 511, 512, 513, 514, 516, 517,
518, 345, 349, 350, 505, 506, 465; 325/354,
355, 359, 360, 365, 366, 368

[56] References Cited

U.S. PATENT DOCUMENTS

| | | | |
|---|---|---|---|
| 4,402,080 | 8/1983 | Mueller | 370/100 |
| 4,675,886 | 6/1987 | Surie | 375/116 |
| 5,204,859 | 4/1993 | Paesler et al. | 370/514 |
| 5,400,369 | 3/1995 | Ikemura | 375/368 |
| 5,483,539 | 1/1996 | Kaufmann | 370/509 |
| 5,490,147 | 2/1996 | Kubo | 370/509 |
| 5,608,734 | 3/1997 | Sandler et al. | 370/509 |
| 5,729,578 | 3/1998 | Oshita | 375/363 |
| 5,784,277 | 7/1998 | Meyer | 364/400.01 |
| 5,809,093 | 9/1998 | Cooper | 375/365 |
| 5,854,794 | 12/1998 | Pawlowski | 370/509 |
| 5,943,376 | 8/1999 | Proctor et al. | 375/358 |

FOREIGN PATENT DOCUMENTS

| | | | |
|---|---|---|---|
| 0561039 | 9/1993 | European Pat. Off. | H04J 3/06 |
| 2063624 | 6/1981 | United Kingdom | H04J 3/06 |
| 2075309 | 11/1981 | United Kingdom | H04L 7/04 |
| 2114336 | 8/1983 | United Kingdom | G06F 15/336 |
| 2151437 | 7/1985 | United Kingdom | H04J 3/06 |
| 9638941 | 12/1996 | WIPO | H04J 3/06 |

*Primary Examiner*—Chi H. Pham
*Assistant Examiner*—Kwang B. Yao
*Attorney, Agent, or Firm*—Baker Botts L.L.P.

[57] ABSTRACT

A wireless telecommunications system (1) includes a central terminal (10) for transmitting and receiving radio frequency signals to and from a subscriber terminal (20). A downlink communication path is established from a transmitter (200) of the central terminal (10) to a receiver (202) of the subscriber terminal (20). A downlink signal (212) is transmitted from the transmitter (200) to the receiver (202) during setup and operation of the wireless telecommunications system (1) carrying information partitioned into a plurality of frames. The downlink signal (212) includes an overhead channel (224) having a frame alignment signal (232) for each frame of information. The receiver (202) monitors the downlink signal (212) to identify the frame alignment signal (232). The downlink communication path is established when the receiver (202) identifies two successive frame alignment signals (232). A frame alignment circuit includes a plurality of shift registers (310) arranged in parallel and frame alignment logic (314, 316) for monitoring the shift registers in parallel to identify a frame alignment word and to establish correct frame alignment.

33 Claims, 13 Drawing Sheets

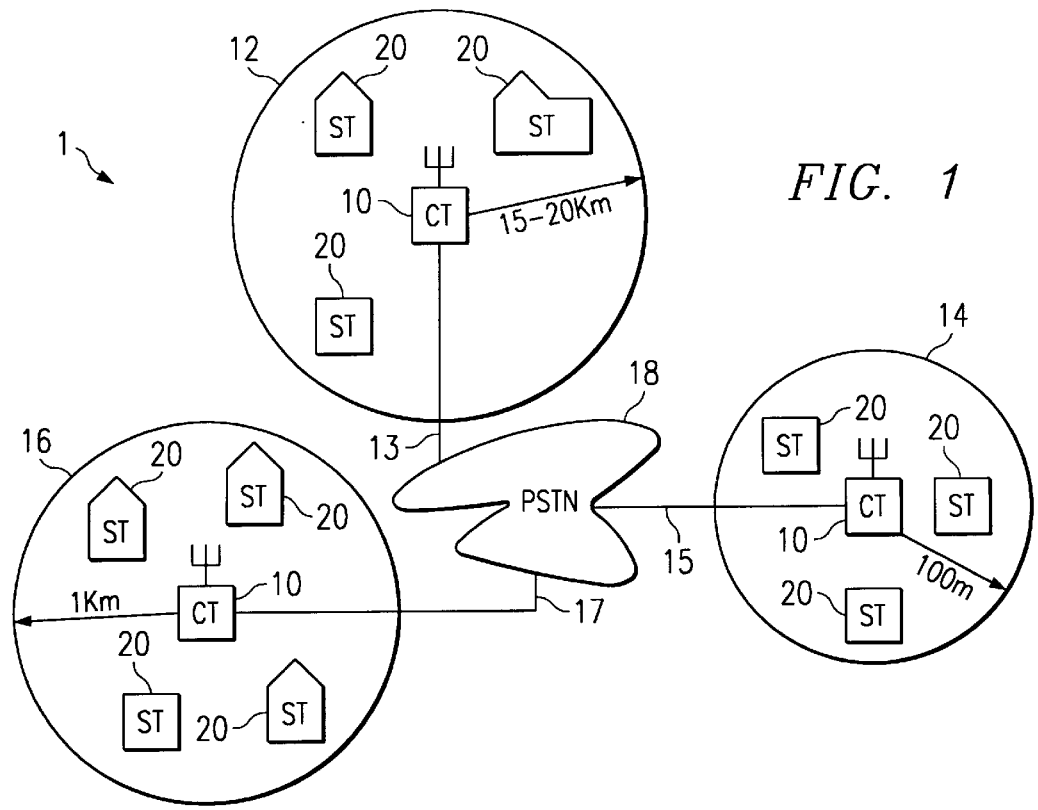
FIG. 1
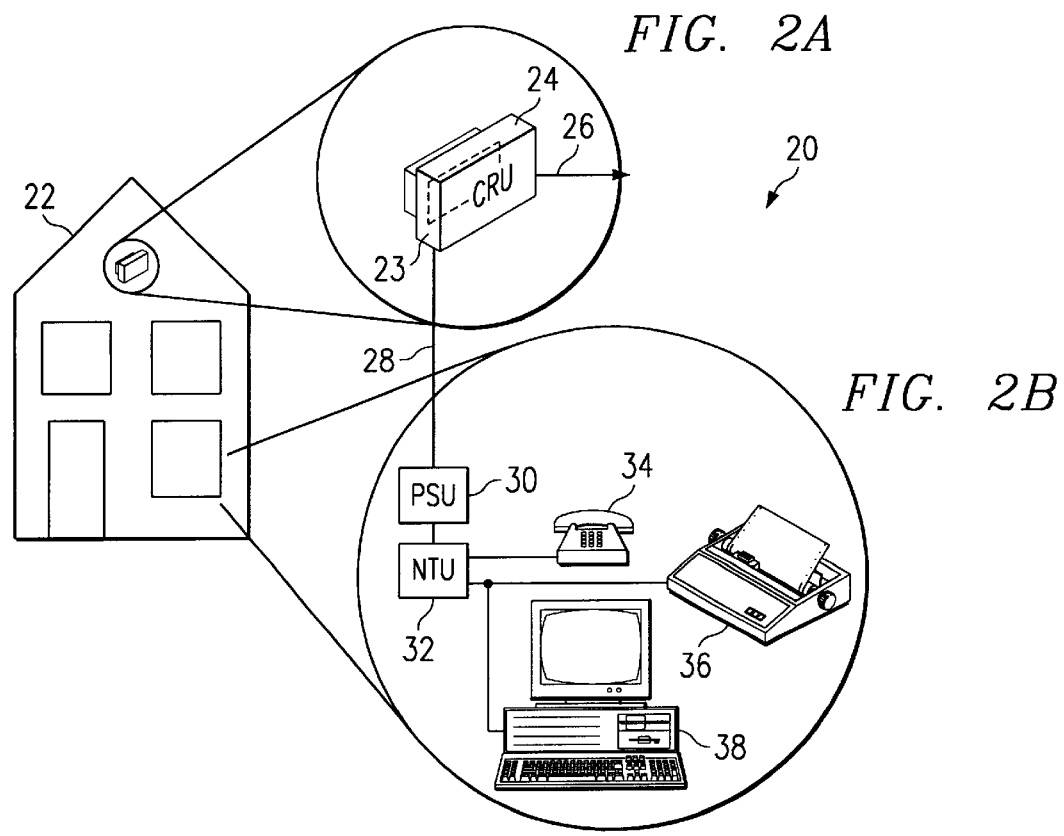
FIG. 2A
FIG. 2B

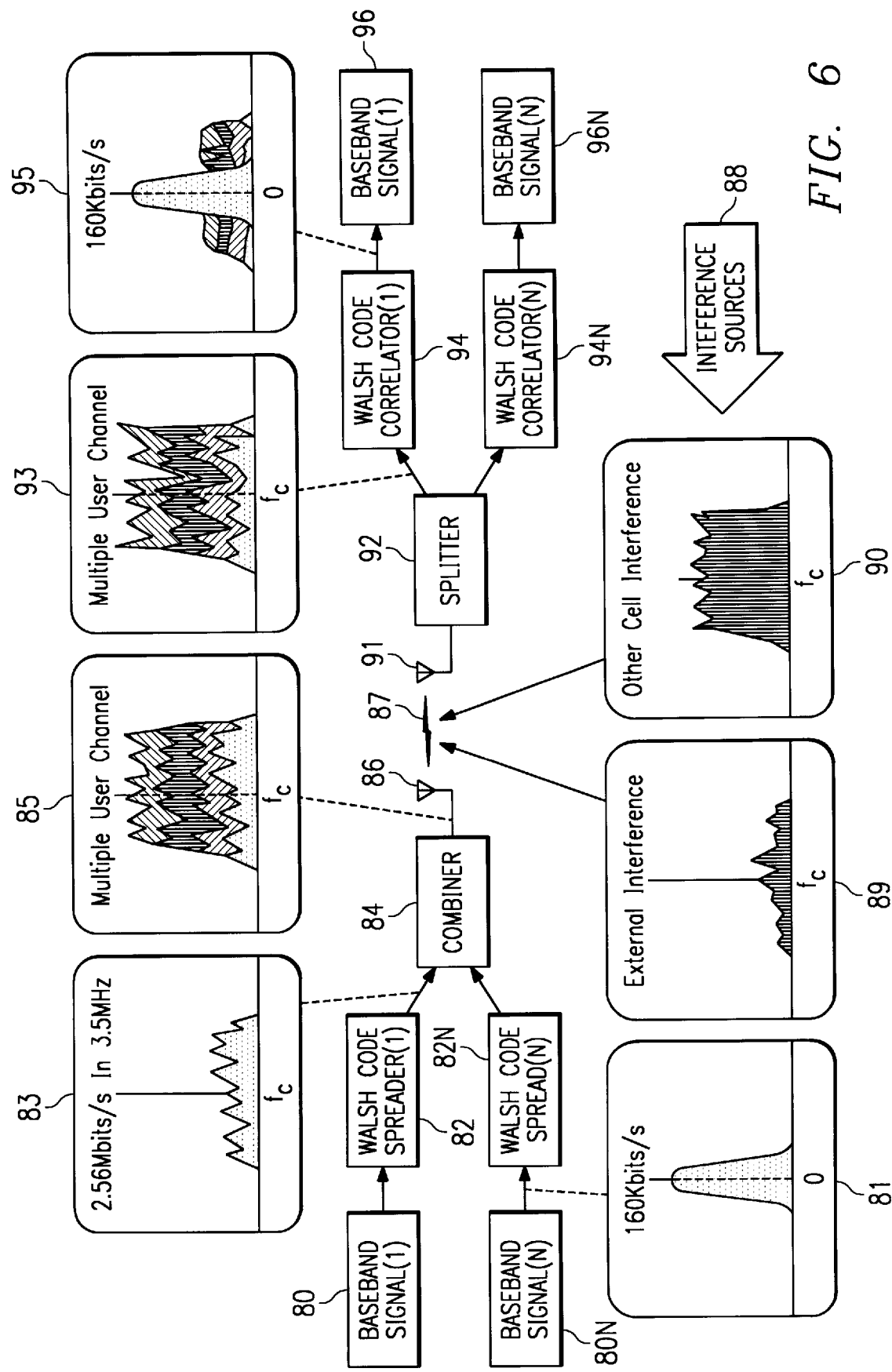

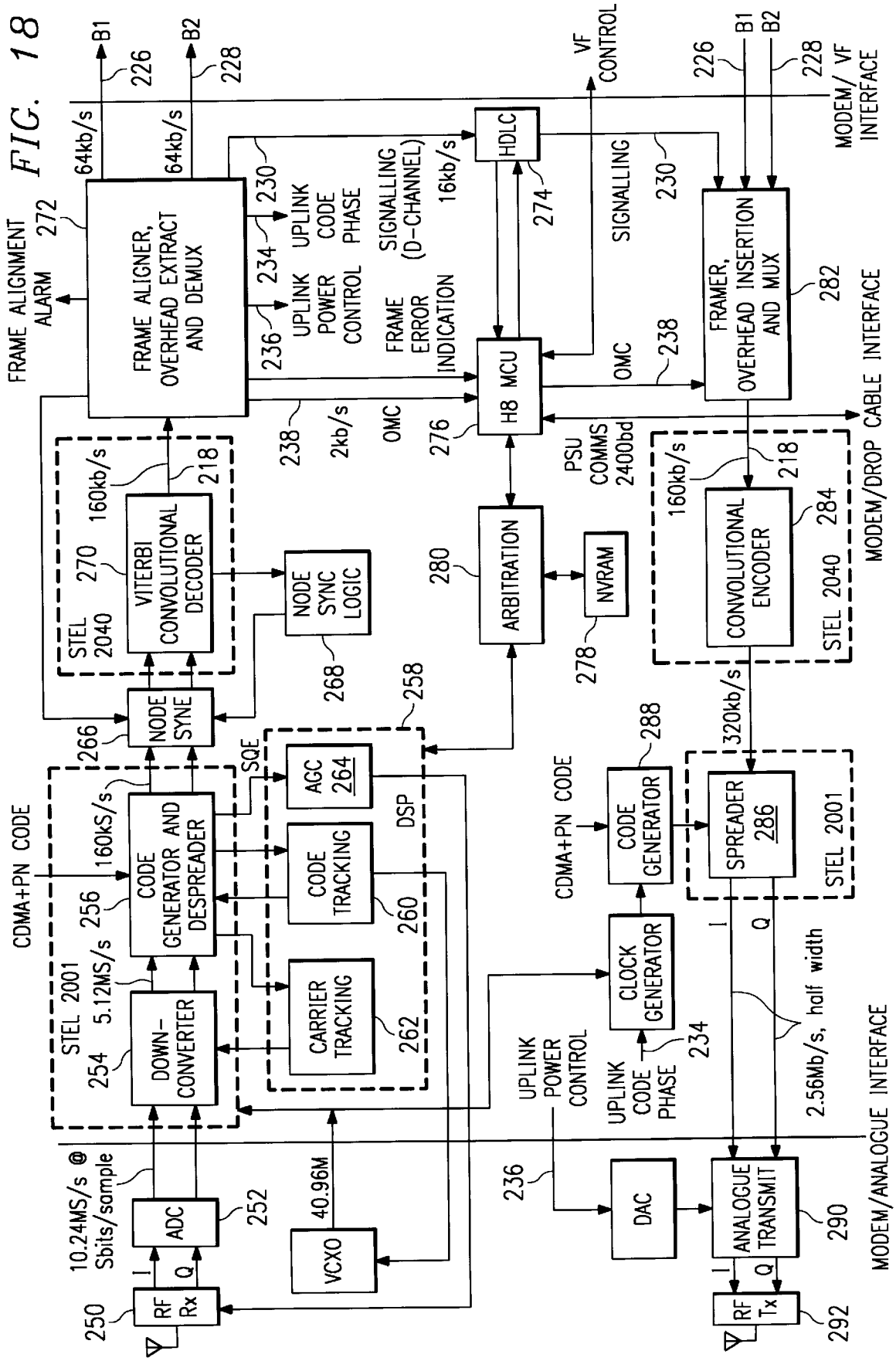

APPARATUS AND METHOD OF FRAME ALIGNING INFORMATION IN A WIRELESS TELECOMMUNICATIONS SYSTEM

TECHNICAL FIELD OF THE INVENTION

The present invention relates in general to a telecommunications system and more particularly to an apparatus and method of frame aligning information in a wireless telecommunications system.

BACKGROUND OF THE INVENTION

In a wireless telecommunications system, communication paths need to be established from an originating source to a destination source and from the destination source to the originating source. In order to establish these communication paths, the destination source should be able to intelligently read information from the originating source and the originating source should be able to intelligently read information from the destination source. The transmitters of the originating or destination sources may send information at one phase and the receivers of the destination or originating sources may receive information out of phase. In such a situation, the receivers will not know at what point in the data stream the receive process has started. Information is partitioned into frames and to adequately process the information the beginning of each frame should be identified. Conventional techniques to frame align information are cumbersome, slow in frame identification, and may lose frames of information. Therefore, it is desirable to quickly and easily identify the beginning of each frame of information to achieve proper processing.

UK patent application GB9513168.6 describes a wireless telecommunications system and method for frame aligning information. In the system described therein a central terminal transmits and receives wireless signals to and from a subscriber terminal. A downlink communication path is established from a transmitter of the central terminal to a receiver of the subscriber terminal. A downlink signal is transmitted from the transmitter to the receiver during setup and operation of the wireless telecommunications system carrying information partitioned into a plurality of frames. The downlink signal includes an overhead channel having a frame alignment signal for each frame of information. The receiver monitors the downlink signal to identify the frame alignment signal. The downlink communication path is established when the receiver identifies two successive frame alignment signals.

Although the approach described in GB9513168.6 enables the reliable establishment of a correct frame alignment, the process of frame alignment can take a not insignificant time due to the need to sequentially sample the frame alignment bits of the frame alignment word, which bits are transmitted sequentially every nth bit of the overhead channel, successive bits of the overhead channel being transmitted every mth bit of the wireless communications signal. The time taken for frame alignment can be particularly noticeable where the wireless link is lost during transmission and has to be re-established, or where frame alignment is lost due to noise or other reasons.

SUMMARY OF THE INVENTION

An object of the present invention is to provide an improved apparatus and/or a method of frame aligning information in a wireless telecommunications system.

In accordance with a first aspect of the invention, there is provided apparatus for frame aligning information at a station of a wireless telecommunications system, the apparatus comprising: a plurality of shift registers arranged in parallel to sample data symbols from a wireless communications signal; a strobe generator for generating respective clock strobes for each of the shift registers at a control channel rate of the wireless communications signal such that each register, in use, samples the data symbols at a respective sample timing in a predetermined timing relationship; and frame alignment logic arranged to monitor the shift registers in parallel to identify a received frame alignment word formed from successive sampled data symbols in a shift register for identifying a correct frame alignment for the received wireless communications signal.

By providing a plurality of shift registers arranged in parallel and then monitoring the shift registers in parallel, it is possible simultaneously to investigate a plurality of possible frame alignment positions and to provide rapid identification of the correct frame alignment position. Preferably, the frame alignment logic comprises comparator logic arranged separately to compare the sampled data symbols in each of the shift registers to a frame alignment word stored in a frame alignment word register. The comparator logic can be arranged to output a match signal for a shift register when its contents match the stored frame alignment word.

Preferably, the frame alignment logic comprises a state machine for controlling the strobe generator, the state machine being responsive to match signals from the comparator logic.

Where a first one of the shift registers forms a primary shift register with remaining ones of the shift registers forming secondary shift registers, the state machine is preferably operable to respond to a first match signal for any of the secondary shift registers during a predetermined period to adjust sample timings of the primary shift register for a subsequent predetermined period to correspond to that of the matched one of the secondary shift registers and to adjust sample timings of the secondary shift registers in accordance with the predetermined timing relationship. This facilitates the design of the circuitry downstream of the frame alignment apparatus, as the downstream circuitry can be synchronised to the sample timings of the primary shift register.

In a preferred embodiment, the state machine is operable to respond to a timing of a match to set sample timings of the primary shift register for a subsequent predetermined period to correspond to that of the match timing and to set sample timings of the secondary shift registers in accordance with the predetermined timing relationship.

Where the number of possible sample timings of the frame alignment word is a multiple (e.g., two) of the number of shift registers the state machine is preferably operable to respond to an absence of a match signal during a given predetermined period to shift the sample timings of all the shift registers for a subsequent predetermined period by a single data symbol timing.

The predetermined period is preferably a period corresponding to that for receipt of a frame of information.

Preferably, the frame alignment logic is operable, following identification of a received frame alignment word in one frame period to verify the frame alignment during a subsequent frame period. This is advantageous because it is possible for a sequence of data symbols the same as that of the frame alignment word to be sampled from the communications signal, thus giving a false identification of frame alignment. However, this is very unlikely to occur twice in a row. Accordingly, the verification provides a higher degree of confidence that the correct frame alignment has been identified.

Preferably, the comparator logic also compares the sampled data symbols in each of the registers to an inversion of the stored frame alignment word and outputs a second match signal for a shift register when its content matches the inverted frame alignment word.

Advantageously, the frame alignment logic continuously monitors the received communications signal for received frame alignment words, the apparatus re-identifying two successive received frame alignment words in response to an interruption of the communication signal or on receiving four successive frames of information without detecting a frame alignment word. This enables rapid frame alignment following a signal loss or other interruption.

The predetermined timing relationship can be i, i+2P, i+4P, i+6P, etc, for primary and successive secondary shift registers respectively, where i is a first timing for the primary shift register, and P is a data symbol period, whereby alternate data symbols of the wireless communications signal are monitored. In this manner, alternate data symbol samples are monitored at the control channel rate, ensuring that in the absence of a match, only a single symbol slip is required to be sure of finding the correct frame alignment. For example, where the control channel is an overhead channel of the wireless communications signal and successive bits of the overhead channel are encoded at every mth (e.g., every 10th) bit position of the wireless communications signal, m/2 (e.g. 5) shift registers are preferably provided. Preferably, the frame alignment word and each shift register each comprise n bits.

The invention also provides a receiver for a station of a wireless telecommunications system comprising apparatus as described above.

The invention further provides a subscriber station of a wireless telecommunications system comprising a receiver as described above and a central station of a wireless telecommunications system comprising a receiver as described above.

Moreover, the invention provides a system for frame aligning information in a wireless telecommunications system, comprising: a transmitter in a central station operable to transmit a downlink signal, the downlink signal including a frame alignment word for each frame of information carried by the downlink signal; and a receiver in a subscriber station operable to receive the downlink signal, the receiver comprising apparatus as described above operable to identify two successive frame alignment words in the downlink signal, the receiver being operable to establish a downlink communication path from the transmitter in the central station to the receiver in the subscriber station upon identifying two successive frame alignment words.

The invention similarly provides a system for frame aligning information in a wireless telecommunications system, comprising: a transmitter in a subscriber station operable to transmit an uplink signal, the uplink signal including a frame alignment word for each frame of information carried by the uplink signal; and a receiver in a central station operable to receive the uplink signal, the receiver comprising apparatus as described above operable to identify two successive frame alignment words in the uplink signal, the receiver being operable to establish an uplink communication path from the transmitter in the subscriber station to the receiver in the central station upon identifying two successive frame alignment words.

In accordance with another aspect of the invention, there is provided a method of aligning information in a wireless telecommunications system, comprising the steps of: receiving a wireless communications signal at a second station of the wireless telecommunications system, the wireless communications signal being transmitted from a first station of the wireless communications system; sampling, in parallel in a plurality of shift registers, selected data symbols from the received wireless telecommunications signal, each shift register sampling the data symbols at a respective sample timing in a predetermined timing relationship; and monitoring the shift registers in parallel to identify a received frame alignment word formed from successive sampled data symbols in a the shift register for establishing a correct frame alignment for the received wireless communications signal.

BRIEF DESCRIPTION OF THE INVENTION

An embodiment of the invention will be described hereinafter, by way of example only, with reference to the accompanying drawings in which like reference signs are used for like features and in which:

FIG. 1 is a schematic overview of an example of a wireless telecommunications system in which an example of the present invention is included;

FIG. 2 is a schematic representation of a customer premises;

FIGS. 2A and 2B are schematic illustration of an example of a subscriber terminal of the telecommunications system of FIG. 1;

FIG. 6 is a schematic diagram illustrating aspects of a code division multiplex system for the telecommunications system of FIG. 1;

FIG. 18 is a schematic diagram illustrating the operation of the receiver and transmitter in the subscriber terminal.

DETAILED DESCRIPTION OF THE INVENTION

Figure 3:
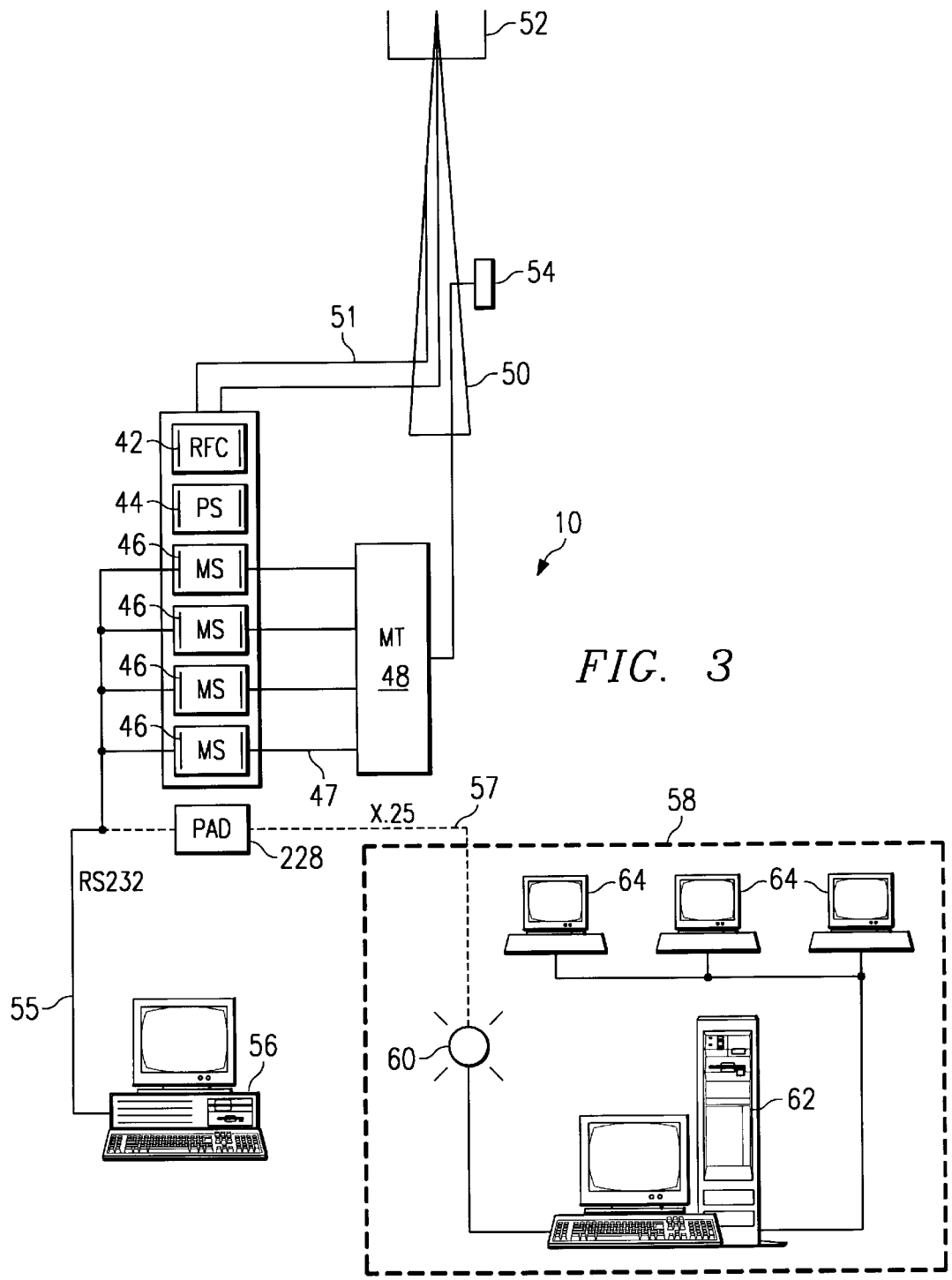
FIG. 3 is a schematic illustration of an example of a central terminal of the telecommunications system of FIG. 1.

FIG. 1 is a schematic overview of an example of a wireless telecommunications system. The telecommunications system includes one or more service areas 12, 14 and 16, each of which is served by a respective central terminal (CT) 10 which establishes a radio link with subscriber terminals (ST) 20 within the area concerned. The area which is covered by a central terminal 10 can vary. For example, in a rural area with a low density of subscribers, a service area 12 could cover an area with a radius of 15–20 Km. A service area 14 in an urban environment where is there is a high density of subscriber terminals 20 might only cover an area with a radius of the order of 100 m. In a suburban area with an intermediate density of subscriber terminals, a service area 16 might cover an area with a radius of the order of 1 Km. It will be appreciated that the area covered by a particular central terminal 10 can be chosen to suit the local requirements of expected or actual subscriber density, local geographic considerations, etc, and is not limited to the examples illustrated in FIG. 1. Moreover, the coverage need not be, and typically will not be circular in extent due to antenna design considerations, geographical factors, buildings and so on, which will affect the distribution of transmitted signals.

The central terminals 10 for respective service areas 12, 14, 16 can be connected to each other by means of links 13, 15 and 17 which interface, for example, with a public switched telephone network (PSTN) 18. The links can include conventional telecommunications technology using copper wires, optical fibres, satellites, microwaves, etc.

The wireless telecommunications system of FIG. 1 is based on providing fixed microwave links between subscriber terminals 20 at fixed locations within a service area (e.g., 12, 14, 16) and the central terminal 10 for that service area. In a preferred embodiment each subscriber terminal 20 is provided with a permanent fixed access link to its central terminal 10. However, in alternative embodiments demand-based access could be provided, so that the number of subscribers which can be serviced exceeds the number of telecommunications links which can currently be active.

FIG. 2 includes a schematic representation of customer premises 22. FIGS. 2A and 2B illustrate an example of a configuration for a subscriber terminal 20 for the telecommunications system of FIG. 1. A customer radio unit (CRU) 24 is mounted on the customer's premises. The customer radio unit 24 includes a flat panel antenna or the like 23. The customer radio unit is mounted at a location on the customer's premises, or on a mast, etc., and in an orientation such that the flat panel antenna 23 within the customer radio unit 24 faces in the direction 26 of the central terminal 10 for the service area in which the customer radio unit 24 is located.

The customer radio unit 24 is connected via a drop line 28 to a power supply unit (PSU) 30 within the customer's premises. The power supply unit 30 is connected to the local power supply for providing power to the customer radio unit 24 and a network terminal unit (NTU) 32. The customer radio unit 24 is also connected to via the power supply unit 30 to the network terminal unit 32, which in turn is connected to telecommunications equipment in the customer's premises, for example to one or more telephones 34, facsimile machines 36 and computers 38. The telecommunications equipment is represented as being within a single customer's premises. However, this need not be the case, as the subscriber terminal 20 preferably supports either a single or a dual line, so that two subscriber lines could be supported by a single subscriber terminal 20. The subscriber terminal 20 can also be arranged to support analogue and digital telecommunications, for example analogue communications at 16, 32 or 64 kbits/sec or digital communications in accordance with the ISDN BRA standard.

FIG. 3 is a schematic illustration of an example of a central terminal of the telecommunications system of FIG. 1. The common equipment rack 40 comprises a number of equipment shelves 42, 44, 46, including a RF Combiner and power amp shelf (RFC) 42, a Power Supply shelf (PS) 44 and a number of (in this example four) Modem Shelves (MS) 46. The RF combiner shelf 42 allows the four modem shelves 46 to operate in parallel. It combines and amplifies the power of four transmit signals, each from a respective one of the four modem shelves, and amplifies and splits received signals four way so that separate signals may be passed to the respective modem shelves. The power supply shelf 44 provides a connection to the local power supply and fusing for the various components in the common equipment rack 40. A bidirectional connection extends between the RF combiner shelf 42 and the main central terminal antenna 52, typically an omnidirectional antenna, mounted on a central terminal mast 50.

This example of a central terminal 10 is connected via a point-to-point microwave link to a location where an interface to the public switched telephone network 18, shown schematically in FIG. 1, is made. As mentioned above, other types of connections (e.g., copper wires or optical fibres) can be used to link the central terminal 10 to the public switched telephone network 18. In this example the modem shelves are connected via lines 47 to a microwave terminal (MT) 48. A microwave link 49 extends from the microwave terminal 48 to a point-to-point microwave antenna 54 mounted on the mast 50 for a host connection to the public switched telephone network 18.

A personal computer, workstation or the like can be provided as a site controller (SC) 56 for supporting the central terminal 10. The site controller 56 can be connected to each modem shelf of the central terminal 10 via, for example, RS232 connections 55. The site controller 56 can then provide support functions such as the localisation of faults, alarms and status and the configuring of the central terminal 10. A site controller 56 will typically support a single central terminal 10, although a plurality of site controllers 56 could be networked for supporting a plurality of central terminals 10.

As an alternative to the RS232 connections 55, which extend to a site controller 56, data connections such as an X.25 links 57 (shown with dashed lines in FIG. 3) could instead be provided from a pad 228 to a switching node 60 of an element manager (EM) 58. An element manager 58 can support a number of distributed central terminals 10 connected by respective connections to the switching node 60. The element manager 58 enables a potentially large number (e.g., up to, or more than 1000) of central terminals 10 to be integrated into a management network. The element manager 58 is based around a powerful workstation 62 and can include a number of computer terminals 64 for network engineers and control personnel.

Figure 3A:
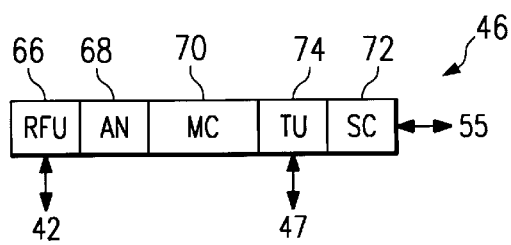
FIG. 3A is a schematic illustration of a modem shelf of a central terminal of the telecommunications system of FIG. 1.

FIG. 3A illustrates various parts of a modem shelf 46. A transmit/receive RF unit (RFU—for example implemented on a card in the modem shelf) 66 generates the modulated transmit RF signals at medium power levels and recovers and amplifies the baseband RF signals for the subscriber terminals. The RF unit 66 is connected to an analogue card (AN) 68 which performs A-D/D-A conversions, baseband filtering and the vector summation of 15 transmitted signals from the modem cards (MCs) 70. The analogue unit 68 is connected to a number of (typically 1–8) modem cards 70. The modem cards perform the baseband signal processing of the transmit and receive signals to/from the subscriber terminals 20. This includes ½ rate convolution coding and x 16 spreading with CDMA codes on the transmit signals, and synchronisation recovery, despreading and error correction on the receive signals. Each modem card 70 in the present example has two modems, each modem supporting one subscriber link (or two lines) to a subscriber terminal 20. Thus, with two modems per card and 8 modems per modem shelf, each modem shelf could support 16 possible subscriber links. However, in order to incorporate redundancy so that a modem may be substituted in a subscriber link when a fault occurs, only up to 15 subscriber links are preferably supported by a single modem shelf 46. The 16th modem is then used as a spare which can be switched in if a failure of one of the other 15 modems occurs. The modem cards 70 are connected to the tributary unit (TU) 74 which terminates the connection to the host public switched telephone network 18 (e.g., via one of the lines 47) and handles the signalling of telephony information to, for example, up to 15 subscriber terminals (each via a respective one of 15 of the 16 modems).

Figure 4:
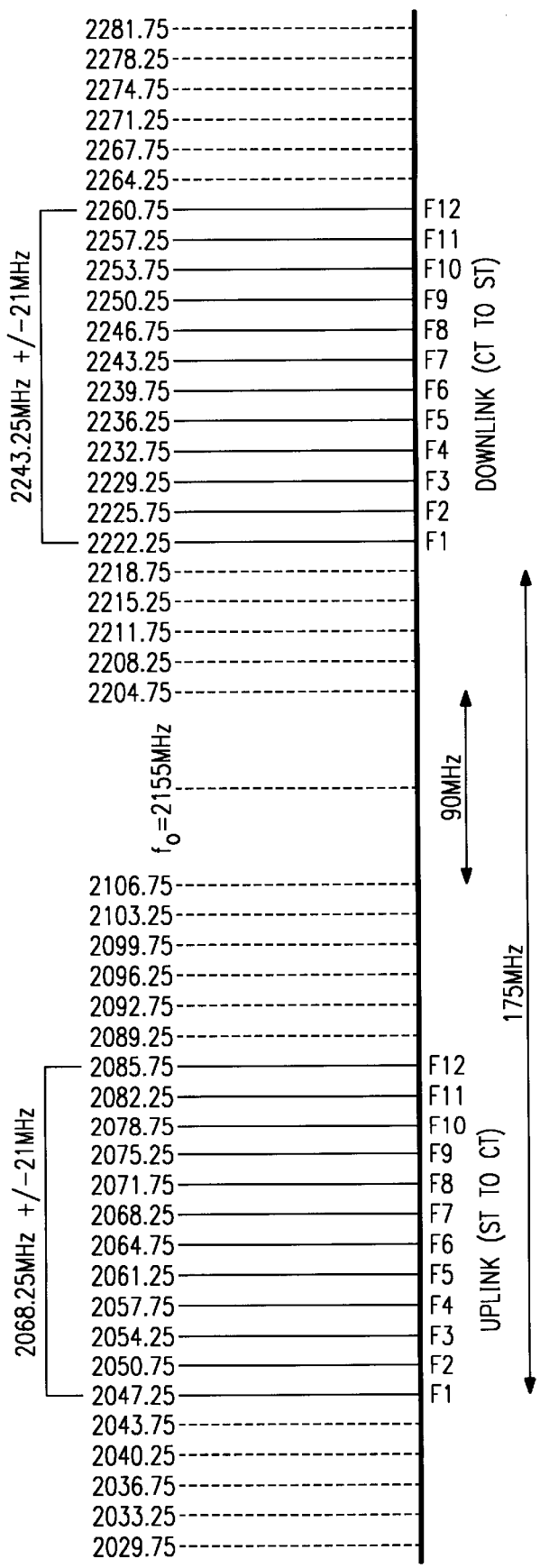
FIG. 4 is an illustration of an example of a frequency plan for the telecommunications system of FIG. 1.

The wireless telecommunications between a central terminal 10 and the subscriber terminals 20 could operate on various frequencies. FIG. 4 illustrates one possible example of the frequencies which could be used. In the present example, the wireless telecommunication system is intended to operate in the 1.5–2.5 GHz Band. In particular the present example is intended to operate in the Band defined by ITU-R (CCIR) Recommendation F.701 (2025–2110 MHz, 2200–2290 MHz). FIG. 4 illustrates the frequencies used for the uplink from the subscriber terminals 20 to the central terminal 10 and for the downlink from the central terminal 10 to the subscriber terminals 20. It will be noted that 12 uplink and 12 downlink radio channels of 3.5 MHz each are provided centred about 2155 MHz. The spacing between the receive and transmit channels exceeds the required minimum spacing of 70 MHz.

In the present example, as mentioned above, each modem shelf will support 1 frequency channel (i.e. one uplink frequency plus the corresponding downlink frequency). Up to 15 subscriber links may be supported on one frequency channel, as will be explained later. Thus, in the present embodiment, each central terminal 10 can support 60 links, or 120 lines.

Typically, the radio traffic from a particular central terminal 10 will extend into the area covered by a neighbouring central terminal 10. To avoid, or at least to reduce interference problems caused by adjoining areas, only a limited number of the available frequencies will be used by any given central terminal 10.

Figure 5A:
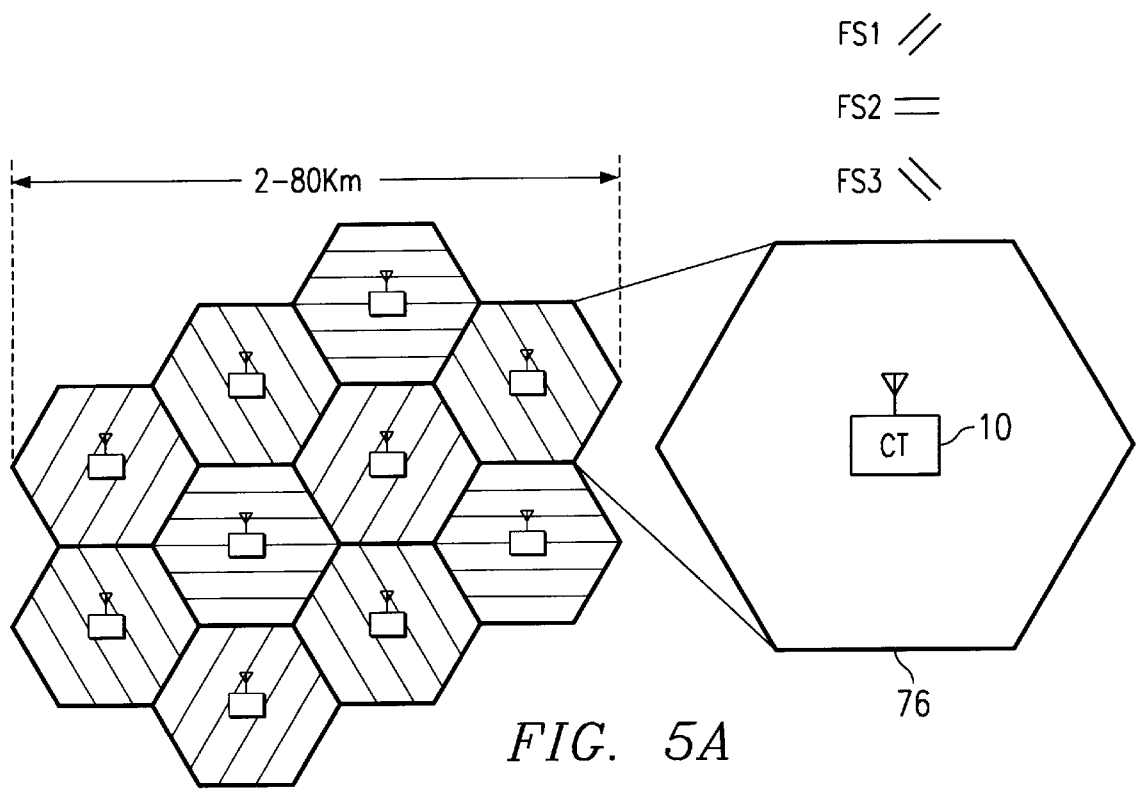
FIGS. 5A and 5B are schematic diagrams illustrating possible configurations for cells for the telecommunications system of FIG. 1.

FIG. 5A illustrates one cellular type arrangement of the frequencies to mitigate interference problems between adjacent central terminals 10. In the arrangement illustrated in FIG. 5A, the hatch lines for the cells 76 illustrate a frequency set (FS) for the cells. By selecting three frequency sets (e.g., where: FS1=F1, F4, F7, F10; FS2=F2, F5, F8, F11; FS3=F3, F6, F9, F12), and arranging that immediately adjacent cells do not use the same frequency set (see, for example, the arrangement shown in FIG. 5A), it is possible to provide an array of fixed assignment omnidirectional cells where interference between nearby cells can be avoided. The transmitter power of each central terminal 10 is set such that transmissions do not extend as far as the nearest cell which is using the same frequency set. Thus each central terminal 10 can use the four frequency pairs (for the uplink and downlink, respectively) within its cell, each modem shelf in the central terminal 10 being associated with a respective RF channel (channel frequency pair).

Figure 5B:
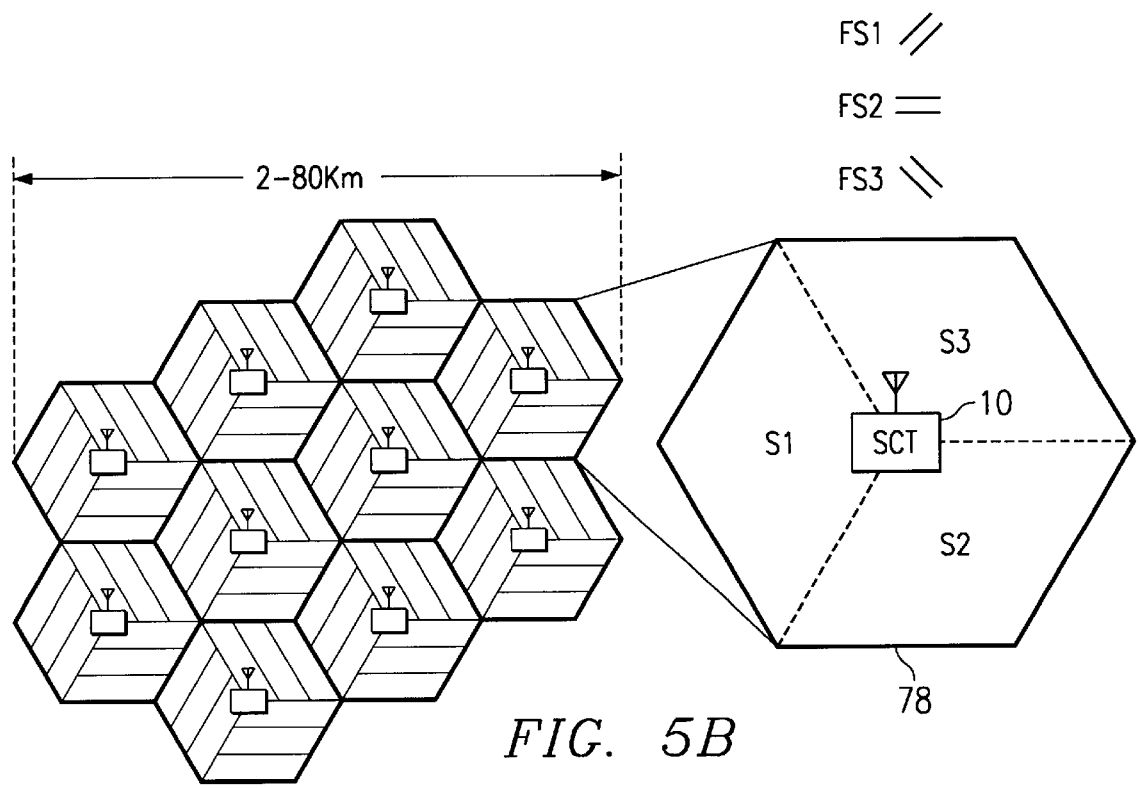

With each modem shelf supporting one channel frequency (with 15 subscriber links per channel frequency) and four modem shelves, each central terminal 10 will support 60 subscriber links (i.e., 120 lines). The 10 cell arrangement in FIG. 5A can therefore support up to 600 ISDN links or 1200 analogue lines, for example. FIG. 5B illustrates a cellular type arrangement employing sectored cells to mitigate problems between adjacent central terminals 10. As with FIG. 5A, the different type of hatch lines in FIG. 5B illustrate different frequency sets. As in FIG. 5A, FIG. 5B represents three frequency sets (e.g., where: FS1=F1, F4, F7, F10; FS2=F2, F5, F8, F11; FS3=F3, F6, F9, F12). However, in FIG. 5B the cells are sectored by using a sectored central terminal (SCT) 13 which includes three central terminals 10, one for each sector S1, S2 and S3, with the transmissions for each of the three central terminals 10 being directed to the appropriate sector among S1, S2 and S3. This enables the number of subscribers per cell to be increased three fold, while still providing permanent fixed access for each subscriber terminal 20.

A seven cell repeat pattern is used such that for a cell operating on a given frequency, all six adjacent cells operating on the same frequency are allowed unique PN codes. This prevents adjacent cells from inadvertently decoding data.

As mentioned above, each channel frequency can support 15 subscriber links. In this example, this is achieved using by multiplexing signals using a Code Division Multiplexed Access (CDMA) technique. FIG. 6 gives a schematic overview of CDMA encoding and decoding.

In order to encode a CDMA signal, base band signals, for example the user signals for each respective subscriber link, are encoded at 80-80N into a 160 ksymbols/sec baseband signal where each symbol represents 2 data bits (see, for example the signal represented at 81). This signal is then spread by a factor of 16 using a respective Walsh pseudo random noise (PN) code spreading function 82-82N to generate signals at an effective chip rate of 2.56 Msymbols/sec in 3.5 MHz. The signals for respective subscriber links are then combined and converted to radio frequency (RF) to give multiple user channel signals (e.g., 85) for transmission from the transmitting antenna 86.

During transmission, a transmitted signal will be subjected to interference sources 88, including external interference 89 and interference from other channels 90. Accordingly, by the time the CDMA signal is received at the receiving antenna 91, the multiple user channel signals may be distorted as is represented at 93.

In order to decode the signals for a given subscriber link from the received multiple user channel, a Walsh correlator 94-94N uses the same pseudo random noise (PN) code that was used for the encoding for each subscriber link to extract a signal (e.g., as represented at 95) for the respective received baseband signal 96-96N. It will be noted that the received signal will include some residual noise. However, unwanted noise can be removed using a low pass filter and signal processing.

The key to CDMA is the application of orthogonal codes that allow the multiple user signals to be transmitted and received on the same frequency at the same time. Once the bit stream is orthogonally isolated using the Walsh codes, the signals for respective subscriber links do not interfere with each other.

Walsh codes are a mathematical set of sequences that have the function of "orthonormality". In other words, if any Walsh code is multiplied by any other Walsh code, the results are zero.

Figure 7:
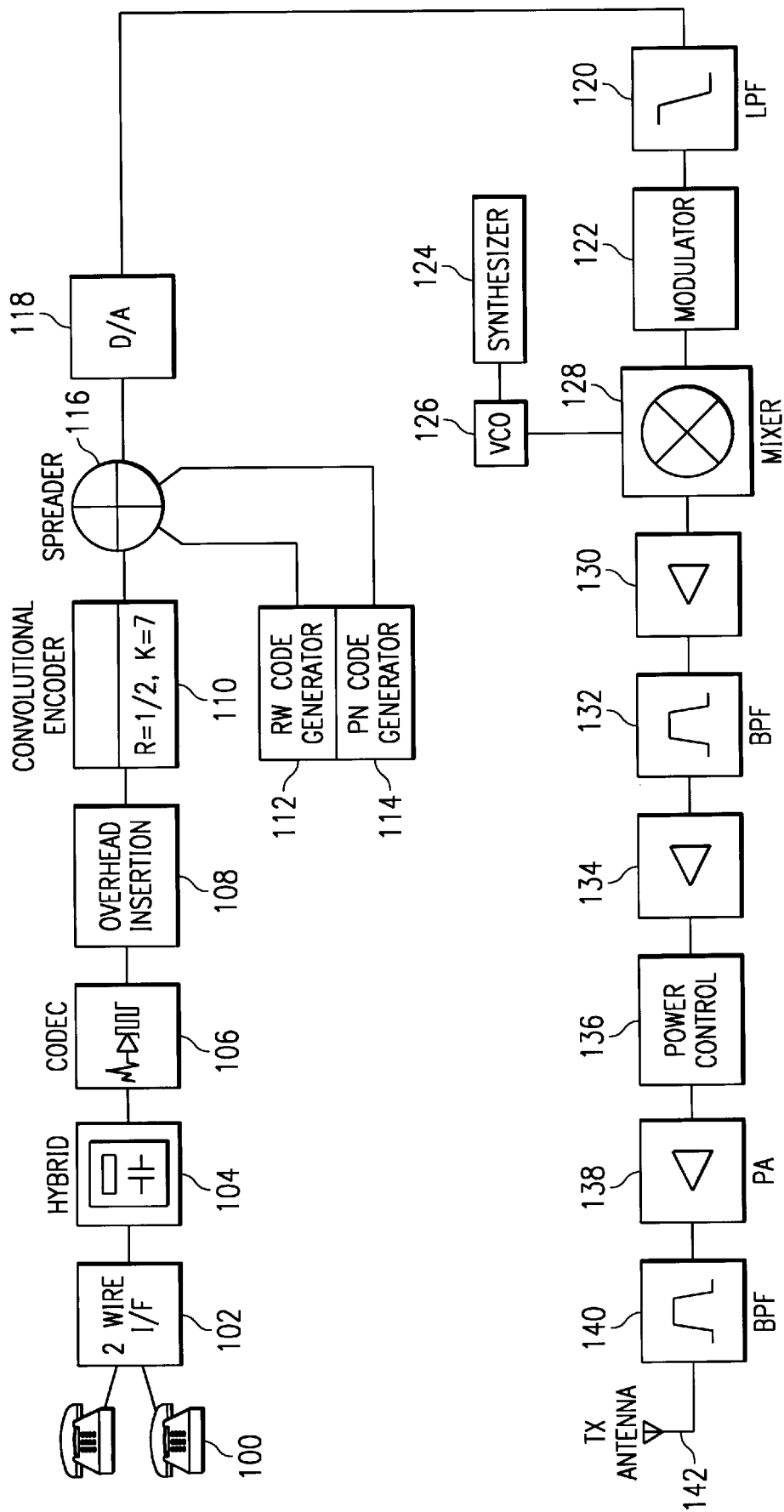
FIG. 7 is a schematic diagram illustrating signal transmission processing stages for the telecommunications system of FIG. 1.

FIG. 7 is a schematic diagram illustrating signal transmission processing stages as configured in a subscriber terminal 20 in the telecommunications system of FIG. 1. The central terminal is also configured to perform equivalent signal transmission processing. In FIG. 7, an analogue signal from one of a pair of telephones is passed via a two-wire interface 102 to a hybrid audio processing circuit 104 and then via a codec 106 to produce a digital signal into which an overhead channel including control information is inserted at 108. The resulting signal is processed by a convolutional encoder 110 before being passed to a spreader 116 to which the Rademacher-Walsh and PN codes are applied by a RW code generator 112 and PN Code generator 114, respectively. The resulting signals are passed via a digital to analogue converter 118. The digital to analogue converter 118 shapes the digital samples into an analogue waveform and provides a stage of baseband power control. The signals are then passed to a low pass filter 120 to be modulated in a modulator 122. The modulated signal from the modulator 122 is mixed with a signal generated by a voltage controlled oscillator 126 which is responsive to a synthesizer 160. The output of the mixer 128 is then amplified in a low noise amplifier 130 before being passed via a band pass filter 132. The output of the band pass filter 132 is further amplified in a further low noise amplifier 134, before being passed to power control circuitry 136. The output of the power control circuitry is further amplified in a further low noise amplifier 138 before being passed via a further band pass filter 140 and transmitted from the transmission antenna 142.

Figure 8:
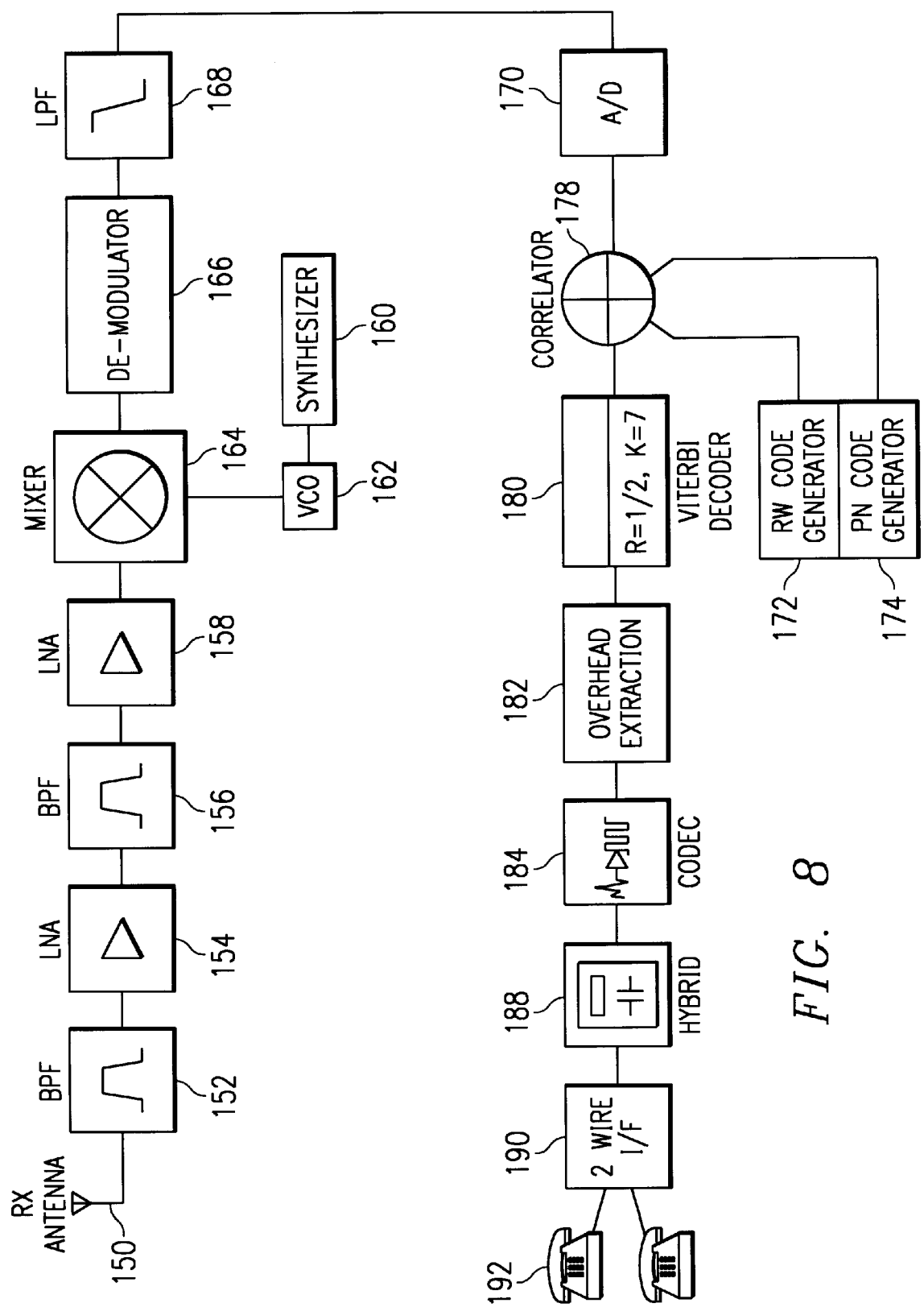
FIG. 8 is a schematic diagram illustrating signal reception processing stages for the telecommunications system of FIG. 1.

FIG. 8 is a schematic diagram illustrating the equivalent signal reception processing stages as configured in a subscriber terminal 20 in the telecommunications system of FIG. 1. The central terminal is also configured to perform equivalent signal reception processing. In FIG. 8, signals received at a receiving antenna 150 are passed via a band pass filter 152 before being amplified in a low noise amplifier 154. The output of the amplifier 154 is then passed via a further band pass filter 156 before being further amplified by a further low noise amplifier 158. The output of the amplifier 158 is then passed to a mixer 164 where it is mixed with a signal generated by a voltage controlled oscillator 162 which is responsive to a synthesizer 160. The output of the mixer 164 is then passed via the de-modulator 166 and a low pass filter 168 before being passed to an analogue to digital converter 170. The digital output of the A/D converter 170 is then passed to a correlator 178, to which the same Rademacher-Walsh and PN codes used during transmission are applied by a RW code generator 172 (corresponding to the RW code generator 112) and a PN code generator 174 (corresponding to PN code generator 114), respectively. The output of the correlator is applied to a Viterbi decoder 180. The output of the Viterbi decoder 180 is then passed to an overhead extractor 182 for extracting the overhead channel information. The output of the overhead extractor 182 is then passed via a codec 184 and a hybrid circuit 188 to a two wire interface 190 where the resulting analogue signals are passed to a selected telephone 192.

At the subscriber terminal 20, a stage of automatic gain control is incorporated at the IF stage. The control signal is derived from the digital portion of the CDMA receiver using the output of a signal quality estimator to be described later.

Figure 9:
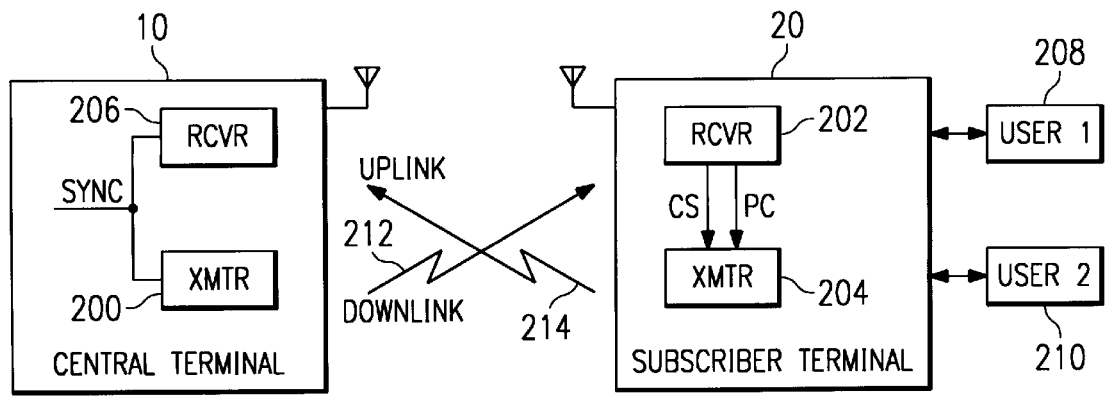
FIG. 9 is a schematic diagram illustrating downlink and uplink communication paths for the wireless telecommunications system.

FIG. 9 is a block diagram of downlink and uplink communication paths between central terminal 10 and subscriber terminal 20. A downlink communication path is established from transmitter 200 in central terminal 10 to receiver 202 in subscriber terminal 20. An uplink communication path is established from transmitter 204 in subscriber terminal 20 to receiver 206 in central terminal 10. Once the downlink and the uplink communication paths have been established in wireless telecommunication system 1, telephone communication may occur between a first user 208 or a second user 210 of subscriber terminal 20 and a user serviced through central terminal 10 over a downlink signal 212 and an uplink signal 214. Downlink signal 212 is transmitted by transmitter 200 of central terminal 10 and received by receiver 202 of subscriber terminal 20. Uplink signal 214 is transmitted by transmitter 204 of subscriber terminal 20 and received by receiver 206 of central terminal 10. Downlink signal 212 and uplink signal 214 are transmitted as CDMA spread spectrum signals.

Figure 10:
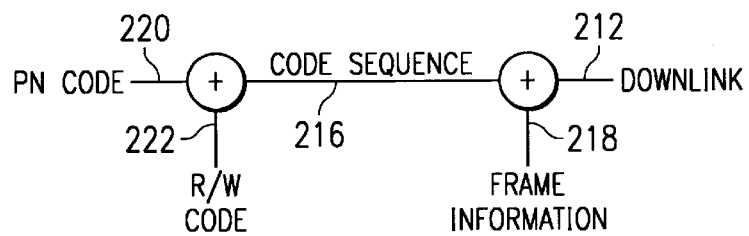
FIG. 10 is a schematic diagram illustrating the makeup of a downlink signal transmitted by the central terminal.

Receiver 206 and transmitter 200 within central terminal 10 are synchronized to each other with respect to time and phase, and aligned as to information boundaries. In order to establish the downlink communication path, receiver 202 in subscriber terminal 20 should be synchronized to transmitter 200 in central terminal 10. Synchronization occurs by performing an acquisition mode function and a tracking mode function on downlink signal 212. Initially, transmitter 200 of central terminal 10 transmits downlink signal 212. FIG. 10 shows the contents of downlink signal 212. Downlink signal 212 includes a code sequence signal 216 for central terminal 10 combined with a frame information signal 218. Code sequence signal 216 is derived from a combination of a pseudo-random noise code signal 220 and a Rademacher-Walsh code signal 222. Although FIG. 10 relates specifically to the makeup of the downlink signal, the uplink has substantially the same makeup.

Each receiver 202 of every subscriber terminal 20 serviced by a single central terminal 10 operate off of the same pseudo-random noise code signal as central terminal 10. Each modem shelf 46 in central terminal 10 supports one radio frequency channel and fifteen subscriber terminals 20, each subscriber terminal having a first user 208 and a second user 210. Each modem shelf 46 selects one of sixteen Rademacher-Walsh code signals 222, each Rademacher-Walsh code signal 222 corresponding to a unique subscriber terminal 20. Thus, a specific subscriber terminal 20 will have an identical code sequence signal 218 as downlink signal 212 transmitted by central terminal 10 and destined for the specific subscriber terminal 20.

Downlink signal 212 is received at receiver 202 of subscriber terminal 20. Receiver 202 compares its phase and code sequence to a phase and code sequence within code sequence signal 216 of downlink signal 212. Central terminal 10 is considered to have a master code sequence and subscriber terminal 20 is considered to have a slave code sequence. Receiver 202 incrementally adjusts the phase of its slave code sequence to recognize a match to master code sequence and place receiver 202 of subscriber terminal 20 in phase with transmitter 200 of central terminal 10. The slave code sequence of receiver 202 is not initially synchronized to the master code sequence of transmitter 200 and central terminal 10 due to the path delay between central terminal 10 and subscriber terminal 20. This path delay is caused by the geographical separation between subscriber terminal 20 and central terminal 10 and other environmental and technical factors affecting wireless transmission.

Figure 11:
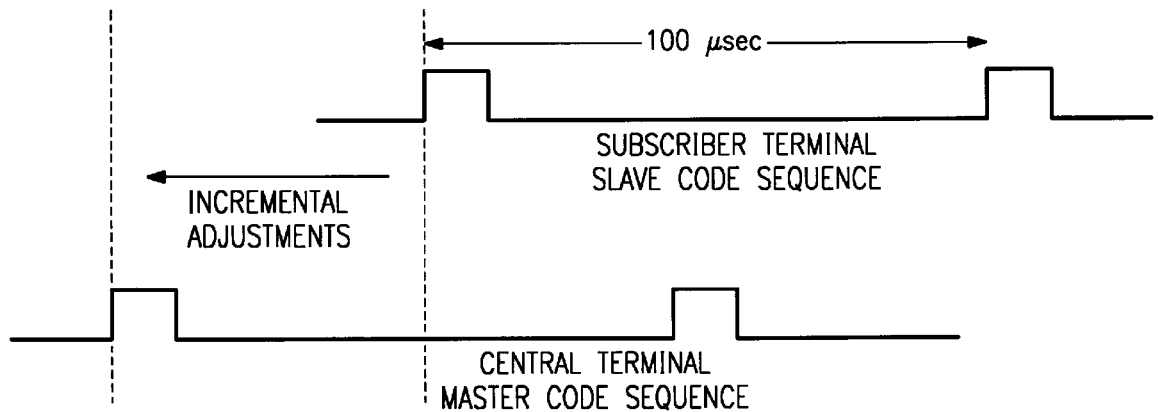
FIG. 11 is a graphical depiction illustrating the phase adjustment to a slave code sequence of the subscriber terminal.

FIG. 11 illustrates how receiver 202 of subscriber terminal 20 adjusts its slave code sequence to match the master code sequence of transmitter 200 in central terminal 10. Receiver 202 increments the phase of the slave code sequence throughout the entire length of the master code sequence within downlink signal 212 and determines a signal quality estimate by performing a power measurement on the combined power of the slave code sequence and the master code sequence for each incremental change in the phase of the slave code sequence. The length of the master code sequence is approximately 100 microseconds based on a chip period of 2.56 MegaHertz. The phase of the slave code sequence is adjusted by one half of a chip period for each incremental interval during the acquisition phase. Receiver 202 completes a first acquisition pass when it identifies a correlation peak where the combined power reaches a maximum value. Receiver 202 performs a second acquisition pass throughout the entire length of the code sequence to verify identification of the maximum value of the combined power at the correlation peak. The approximate path delay between subscriber terminal 20 and central terminal 10 is determined when the correlation peak position is identified in the acquisition mode.

Once acquisition of downlink signal 212 is achieved at receiver 202, fine adjustments are made to the phase of the slave code sequence in order to maintain the phase matching of the slave code sequence with the master code sequence in the tracking mode. Fine adjustments are made through one sixteenth of a chip period incremental changes to the phase of the slave code sequence. Fine adjustments may be performed in either forward (positive) or backward (negative) directions in response to the combined power measurements made by receiver 202. Receiver 202 continuously monitors the master code sequence to ensure that subscriber terminal 20 is synchronized to central terminal 10 for the downlink communication path.

Figure 12:
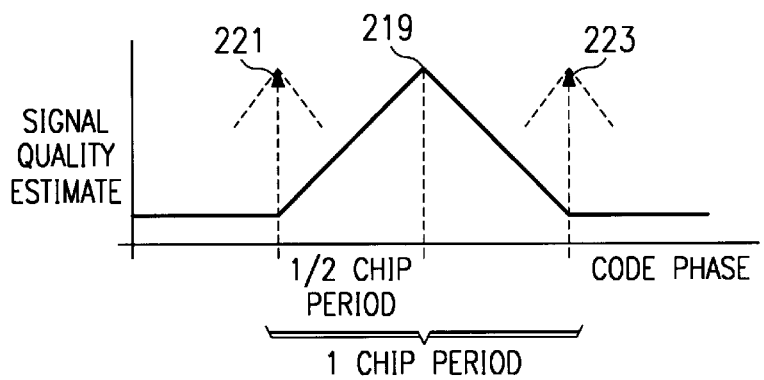
FIG. 12 is a graphical depiction of a signal quality estimate performed by the receiver in the subscriber terminal.

FIG. 12 shows a graph of the combined power curve measured by receiver 202 during the acquisition mode and the tracking mode. The maximum value of the combined power occurs at the correlation peak 219 of the combined power curve. It should be noted that the peak 219 may not be as well defined as in FIG. 12, but may be flattened at the top, more in the form of a plateau. This is the point where the slave code sequence of receiver 202 is in phase with and matches the master code sequence of transmitter 200. Measurements resulting in combined power values that occur off of correlation peak 219 require incremental adjustments to be made to the slave code sequence. A fine adjustment window is established between an early correlator point 221 and a late correlator point 223. An average power measurement is performed at early correlator point 221 and at late correlator point 223. Since early correlator point 221 and late correlator point 223 are spaced one chip period apart, an error signal is produced upon calculating the difference between the average powers of early correlator point 221 and late correlator point 223 that is used to control the fine adjustments to the phase of the slave code sequence.

After acquiring and initiating tracking on the central terminal 10 master code sequence of code sequence signal 216 within downlink signal 212, receiver 202 enters a frame alignment mode in order to establish the downlink communication path. Receiver 202 analyzes frame information within frame information signal 218 of downlink signal 212 to identify a beginning of frame position for downlink signal 212. Since receiver 202 does not know at what point in the data stream of downlink signal 212 it has received information, receiver 202 must search for the beginning of frame position in order to be able to process information received from transmitter 200 of central terminal 10. Once receiver 202 has identified one further beginning of frame position, the downlink communication path has been established from transmitter 200 of central terminal 10 to receiver 202 of subscriber terminal 20.

Figure 13:
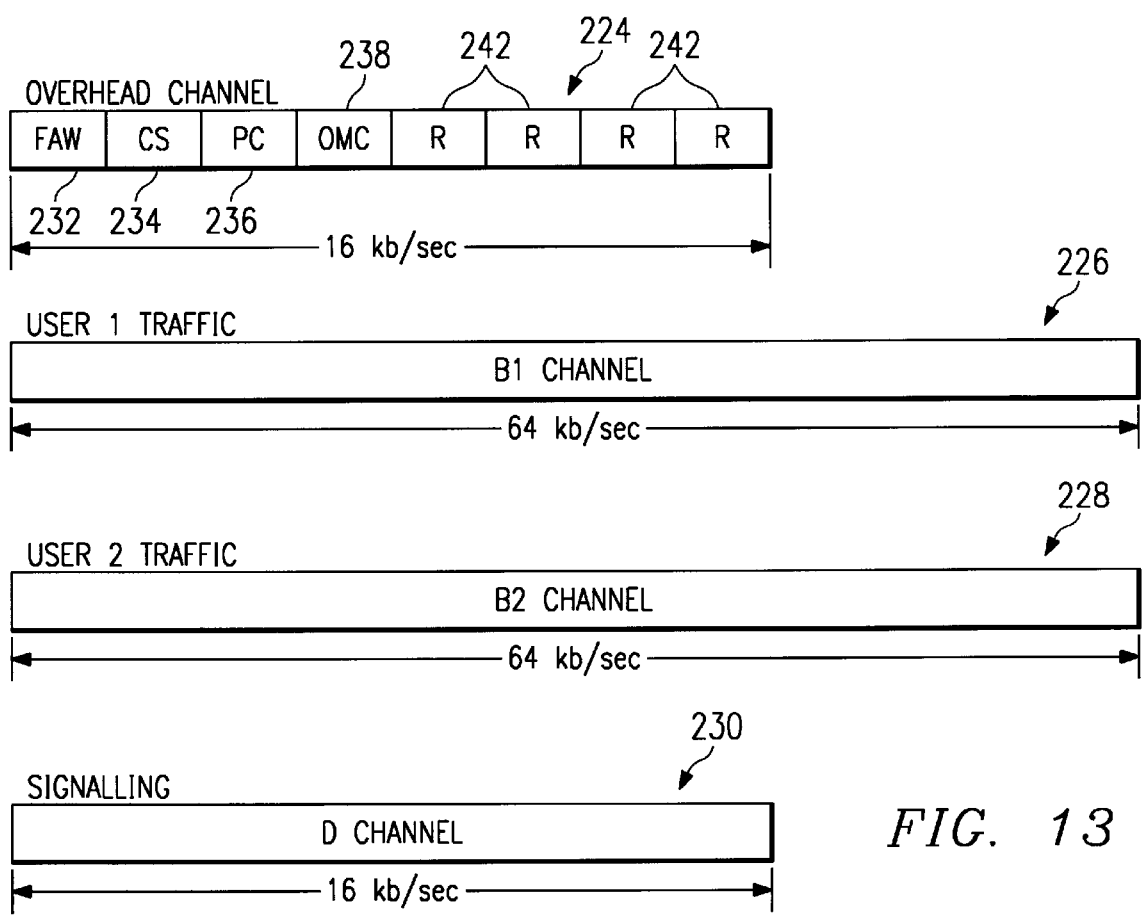
FIG. 13 is a graphical diagram illustrating the contents of a frame information signal within the downlink signal.

FIG. 13 shows the general contents of frame information signal 218. Frame information signal 218 includes an overhead channel 224, a first user channel 226, a second user channel 228, and a signalling channel 230 for each frame of information transported over downlink signal 212. Overhead channel 224 carries control information used to establish and maintain the downlink and uplink communication paths. First user channel 226 is used to transfer traffic information to first user 208. Second user channel 228 is used to transfer traffic information to second user 210. Signalling channel 230 provides the signalling information to supervise operation of subscriber terminal 20 telephony functions. Overhead channel 224 occupies 16 kilobits per second of a frame of information, first user channel 226 occupies 64 kilobits per second of a frame of information, second user channel 228 occupies 64 kilobits per second of a frame of information, and signalling channel 230 occupies 16 kilobits per second of a frame of information.

Figure 14:
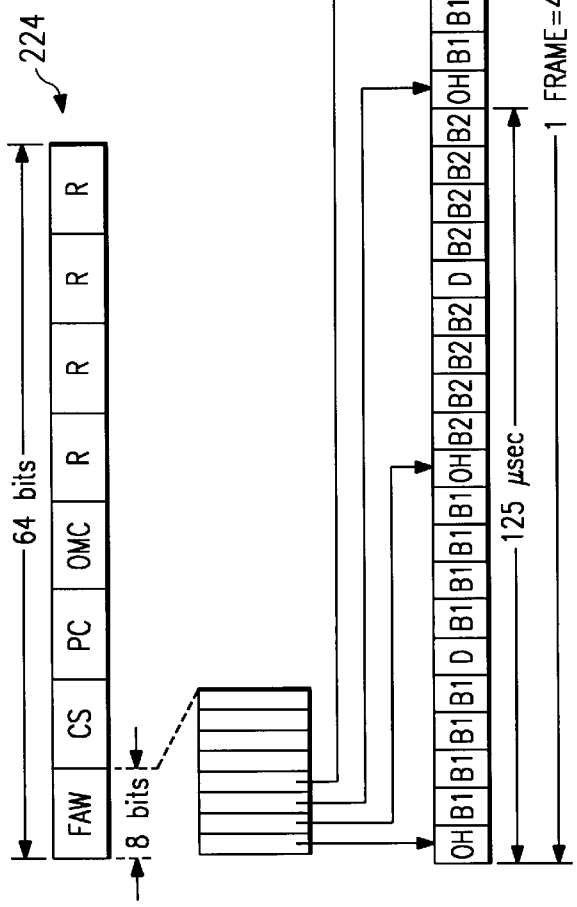
FIG. 14 is a tabular depiction illustrating overhead insertion into a data stream of the downlink signal.

FIG. 14 shows how overhead channel 224 is inserted into the data stream of downlink signal 212. The data stream of downlink signal 212 is partitioned into twenty bit subframes. Each twenty bit subframe has two ten bit sections. A first ten bit section includes an overhead bit, a signalling bit, and eight first user bits. A second ten bit section includes an overhead bit, a signalling bit, and eight second user bits. This twenty bit subframe format is repeated throughout an entire four millisecond frame of information. Thus, an overhead bit occupies every tenth bit position of frame information in the data stream of downlink signal 212.

Overhead channel 224 includes eight byte fields—a frame alignment word 232, a code synchronization signal 234, a power control signal 236, an operations and maintenance channel signal 238, and four reserved byte fields 242. In the uplink signal 214 one of the reserved fields can be used for channel ID information. Frame alignment word 232 identifies the beginning of frame position for its corresponding frame of information. Code synchronization signal 234 provides information to control synchronization of transmitter 204 in subscriber terminal 20 to receiver 206 in central terminal 10. Power control signal 236 provides information to control transmitting power of transmitter 204 in subscriber terminal 20. Operations and maintenance channel signal 238 provides status information with respect to the downlink and uplink communication paths and a path from the central terminal to the subscriber terminal on which the communication protocol which operates on the modem shelf between the shelf controller and the modem cards also extends.

In order to identify two successive beginning of frame positions, receiver 202 of subscriber terminal 20 searches the ten possible bit positions in the data stream of downlink signal 212 for overhead channel 224 and frame alignment word 232. However, rather than the prior approach of extracting a first bit position of every ten bit section of frame information to determine if overhead channel 224 has been captured, and then, if frame alignment word 232 has not been identified after a predetermined period of time from the extraction of the first bit position, repeating this procedure for the second bit position of each ten bit section and subsequent bit positions until frame alignment word 232 has been identified, the searching operation in an embodiment of the invention is performed in parallel.

An example of a frame alignment word 232 which receiver 202 would search for is binary 00010111, that is a predetermined combination of data symbols (here 8 data bits).

Figure 15:
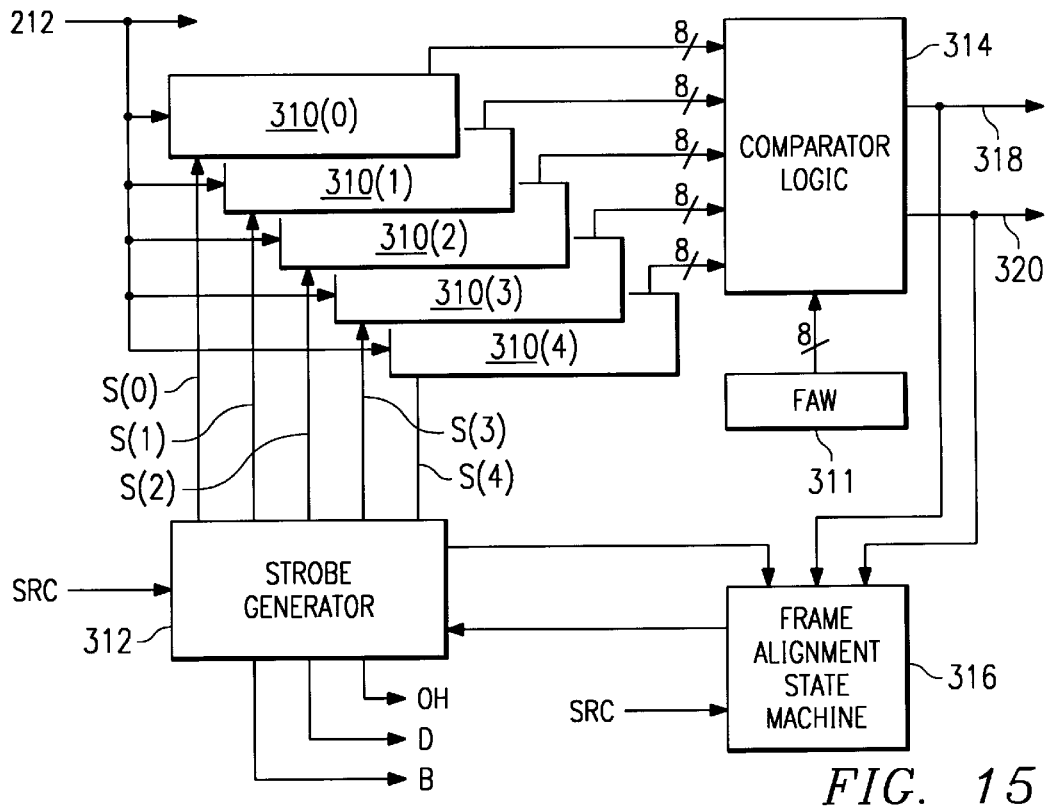
FIG. 15 is a schematic block diagram of a frame alignment circuit of an embodiment of the invention.

FIG. 15 is a schematic representation of a frame alignment circuit for providing frame alignment at the receiver 202 of the subscriber terminal as described above. The data symbols of the communications signal received at the receiver 202 are supplied to each of a plurality (here five) shift registers 310(0)–310(4) in parallel.

A strobe generator 312 produces a plurality of strobes S(0), S(1), S(2), S(3), S(4) at the overhead channel rate (control channel rate) and at respective timings for each of the registers. The overhead rate is the rate at which overhead channel data bits should be received in the downlink data stream at the receiver 202. The strobe generator generates the strobes based on a symbol rate clock SRC, with one symbol rate clock pulse being generated for each symbol period of the received communications signal.

Figure 16A:
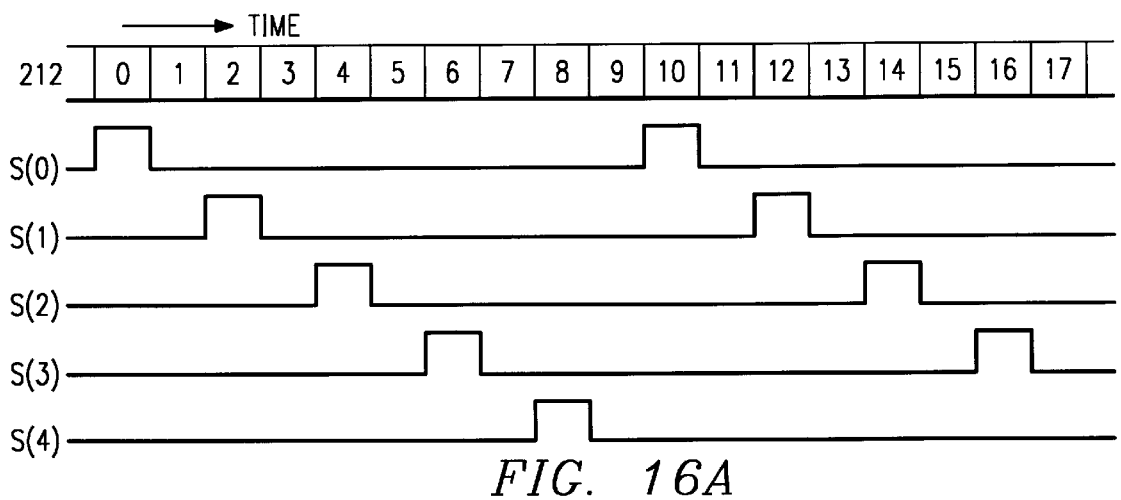
FIGS. 16A and 16B are timing diagrams for explaining the operation of the frame alignment circuit of FIG. 15.

FIG. 16A illustrates the timings of the respective sample strobes S(0)–S(4) for the shift registers 310(0)–310(4). It can thus be seen that each shift register samples every tenth data symbol, with the combination of the five shift registers 310(0)–310(4) ensuring that half of the ten possible symbol positions are sampled at a time.

In the preferred embodiment of the invention illustrated in FIG. 15, an eight bit frame alignment word is used. The shift registers 310(0)–310(4) are preferably eight bit shift registers for holding enough bits to correspond to a full frame alignment word. A further register, the frame alignment word register 311, is a programmable register into which the frame alignment word which is sought can be stored.

Each of the shift registers 310(0)–(4) is shifted in synchronism at the overhead rate, clocked by the strobe signals generated by the strobe generator 312. The search, or comparator logic 314 is arranged to compare the content of each of the registers 310(0)–310(4) to the content of the frame alignment word 311.

The comparator logic 314 provides a logical OR of the result of the comparison for each of the shift registers 310(0)–310(4) and outputs a "found_faw" match signal at 318 when a match is detected for any one of the shift registers 310(0)–310(4).

The search logic 314 continually searches for the frame alignment word in the registers data received from the downlink to ensure that frame alignment is maintained.

The search, or comparator logic 314 is also arranged to compare the content of each of the registers 310(0)–310(4) to the inverse of the content of the frame alignment word register 311. The comparator logic is also provided with "found_faw_not" output 320 which indicates when the inverted frame alignment word is matched in one of the registers 310(0)–310(4).

The operation of the frame alignment circuit is controlled by a frame alignment state machine 316 which is connected to receive the "found_faw" signals 318 and also the "found_faw_not" signals 320. The "found_faw" signals 318 and the "found_faw_not" signals 320 are gated with a 4 ms (frame) marker to form "found" and "found_inv" signals which are used in the state machine 316. The timing of the found_faw and found_faw_not signals is used in the preferred embodiment to determine the correct phase of the strobes to point to the overhead channel.

The state machine 316 is connected to the strobe generator to control the generation of the strobe signals S(0)–S(4). In particular, if, during a given frame period (that is the period within which a frame of information will be received—in the present embodiment 4 ms), a match signal is output from the comparator logic 314 for the shift register 310(0), which is termed herein the primary shift register. This indicates that a frame alignment word has been found in that shift register and the state machine concludes that it has frame alignment correct. If, during the frame period, a match signal is output from the comparator logic 314 for one of the other shift registers 310(1)–310(4), which are termed herein the secondary shift registers, this indicates that a frame alignment word has been found in the shift register concerned. In this case the state machine causes the strobe generator to change the sample timing of the primary shift register 310(0) for the next frame period to correspond to the sample timing of the secondary shift register for which a match was identified and adjusts the sample timings of the secondary shift registers accordingly to maintain the existing mutual timing relationship. For example, if the shift register 310(1) generated a match, the sample timing of each of shift registers would be delayed by two data symbol timings.

If, on the other hand, no match signal is found during a frame period, the state machine causes the sample timings to shift one symbol period, whereby the remaining half of the possible symbol timings can be searched for the frame alignment word.

When the frame alignment state machine has identified one correct frame alignment word, it searches for a second frame alignment word during the next frame period to verify that the frame alignment is correct. Although it is possible for a bit sequence corresponding to the frame alignment word to be sampled from the communications signal data stream 202 during one frame period, it is very unlikely that this will happen in two successive frame periods.

Once the frame alignment state machine has identified the correct frame alignment, it then outputs strobes at timings corresponding to the overhead channel, the B channel and the D channel for the received communications signal as represented in FIG. 1B.

Figure 16B:
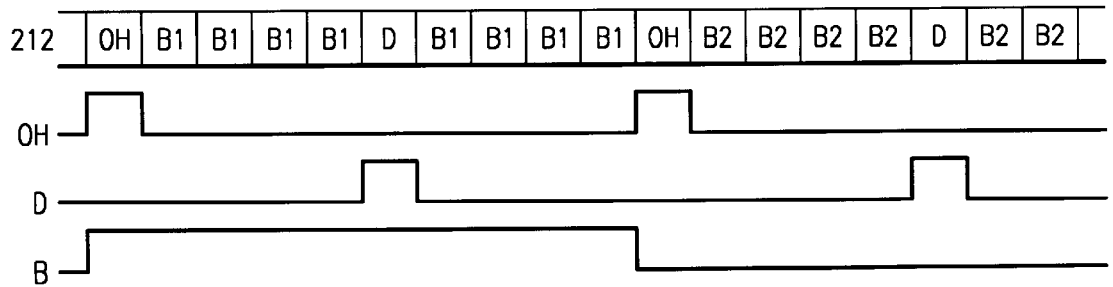
Figure 16C:
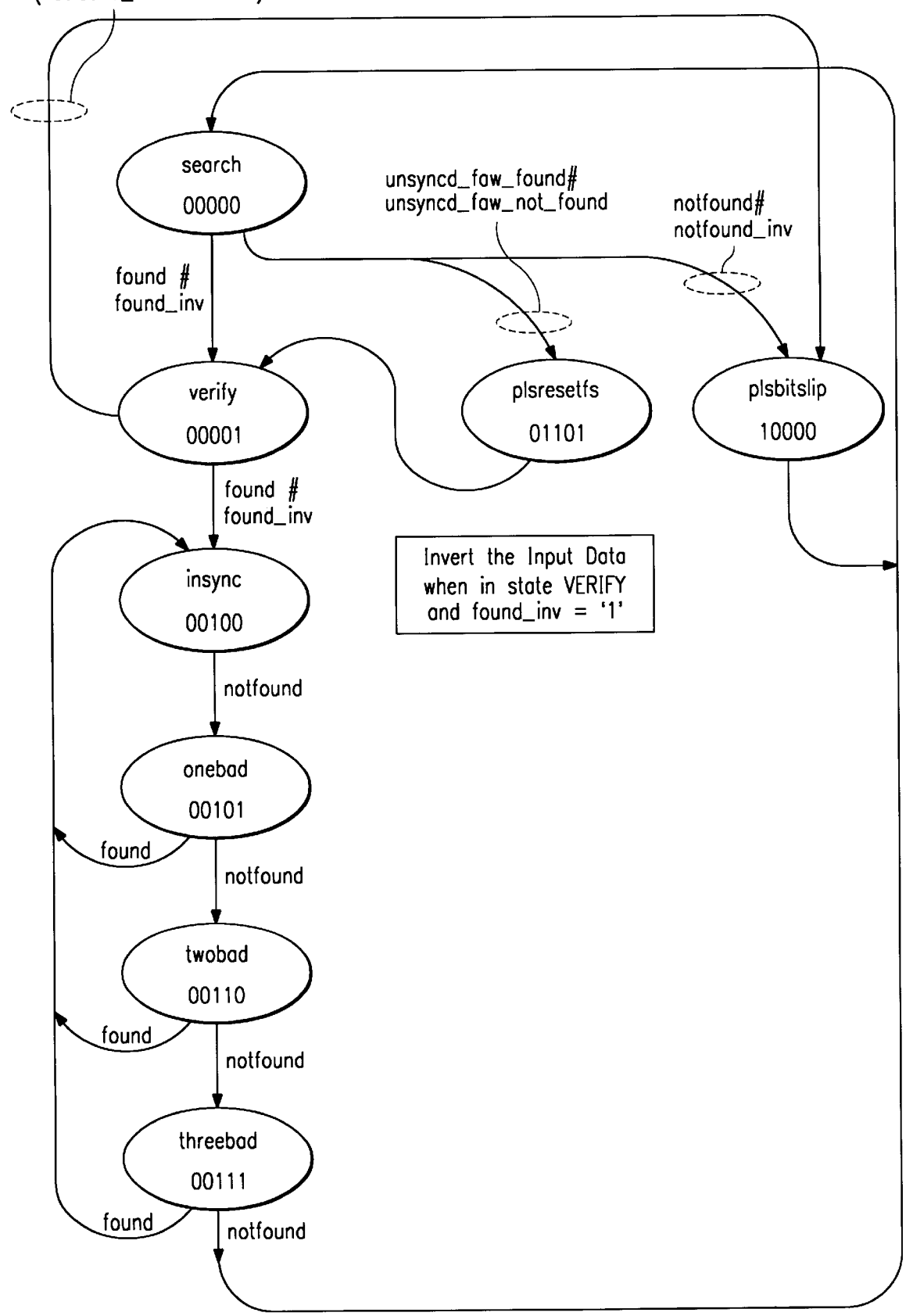
FIG. 16C is state diagram of a state machine of the frame alignment circuit of FIG. 15.

FIG. 16C is a schematic representation in more detail of the operation of the state machine 316 as described above. The following table identifies the meaning of the labels on the various transitions:

found FAW found at correct time
found_inv Inverted FAW found at correct time
notfound FAW not found at expected time
notfound_inv Inverted FAW not found at expected time
unsyncd_faw_found FAW found at wrong time
unsyncd_faw_not_found Inverted FAW found at wrong time In FIG. 16C, State 00000 represents the search state described above where the search logic 314 is searching for the frame alignment word. When the frame alignment word is found in shift register 310(0), the state machine concludes that it has the frame alignment correct and then control steps to state 00001.

In state 00001, the frame alignment is verified. If the frame alignment is found to be correct, then control passes to state 00100 which is the insync state.

The frame alignment state machine rests in the insync state 00100 unless a frame alignment word symbol is found which is not correct, in which case control passes to the onebad state 00101.

If the expected symbol is found in state 00101, then control passes back to the insync state 00100. Otherwise, control passes to a twobad synchronisation state 00110.

If the expected symbol is found in state 00110, then control passes back to the insync state 00100. However, if three bad symbols are found successively, control passes to the threebad state 00111.

If the expected symbol is found in state 00111, then control passes back to the insync state 00100. Otherwise, however, it is assumed that synchronisation has been lost, and control passes back to the search state 00000.

If, in state 00000, a frame alignment word is found in one of the shift registers 310(1)–310(4), then control passes to state plsresetfs 01101.

In the plsresetfs state, the frame synchronisation 01101 is set such that the sample timing of the primary shift register 310(0) is set to the timing of the shift register in which the frame alignment word was found, and the sample timings of the other registers are also reset in the predetermined relationship to the sample timing of the primary shift register 310(0). Control then passes to the verify state 00001.

The plsbitslip state 10000 is entered when the frame alignment word was not found at the expected time and the inverted frame alignment word was not found at the expected time. Accordingly, the plsbitslip state 10000 causes the symbol sample timings of each shift register to be slipped by one symbol and then control returns to the search state 00000.

Although a particular state machine and a particular configuration of the frame alignment circuit has been described with reference to FIGS. 15 and 16, it should be appreciated that alternative arrangements and configurations are also possible.

In the frame alignment circuit shown in FIG. 15, five shift registers 310 are provided. However, as an alternative ten shift registers could be provided, in which case there would be enough shift registers to avoid the need to slip sample timings. This would provide more rapid frame alignment at the cost of extra complexity. Also, in the above description, a 160 k data rate has been assumed. However, with a lower, for example a 40 k data rate, five registers are sufficient to avoid the need for shifting sample timings as well. Furthermore, if for example a different number of bits are provided for the frame alignment words, the capacity of the shift registers could be different. Accordingly, many changes may be made depending upon a particular implementation and the manner in which the frame alignment word is inserted in the overhead channel, and the overhead channel is inserted in the downlink data stream 202.

Also, in the preferred embodiment the search logic 314 ORs the outputs of the comparisons for each of the shift registers 310(0)–310(4) and uses the timing of the match to determine the correct phase of the overhead channel. As an alternative, however, the comparator logic could output five found_faw signals and use the identity of the comparison to identify the correct phase of the overhead channel.

Accordingly, as described above, once the correct bit position yields frame alignment word 232, receiver 202 attempts to identify two successive beginning of frame positions. A downlink communication path is established upon the successful identification of two successive beginning of frame positions in response to recognition of successive frame alignment words 232 in the data stream of downlink signal 212. Receiver 202 continues to monitor the appropriate bit position in order to recognize subsequent frame alignment words 232 for subsequent frames of information. If receiver 202 fails to recognize a frame alignment word 232 for four successive frames, then receiver 202 will return to the search process and cycle through each of the bit positions of the ten bit section until identifying two successive beginning of frame positions through recognition of two successive frame alignment words 232 and reestablishing frame alignment. Failure to recognize four successive frame alignment words 232 may result from a change in the path delay between central terminal 10 and subscriber terminal 20. Receiver 202 will also return to the search process upon an interruption in the downlink communication path from transmitter 200 in central terminal 10 to receiver 202 in subscriber terminal 20.

Upon establishing the downlink communication path from central terminal 10 to subscriber terminal 20 through proper code sequence phase synchronization and frame alignment, wireless telecommunication system 1 performs procedures to establish the uplink communication path from transmitter 204 in subscriber terminal 20 to receiver 206 in central terminal 10. Initially, transmitter 204 is powered off until the downlink communication path has been established to prevent transmitter interference of central terminal communications with other subscriber terminals. After the downlink communication path is established, transmitting power of transmitter 204 is set to a minimum value on command from the central terminal CT via power control channel 236 of overhead channel 224. Power control signal 236 controls the amount of transmitting power produced by transmitter 204 such that central terminal 10 receives approximately the same level of transmitting power from each subscriber terminal 20 serviced by central terminal 10.

Power control signal 236 is transmitted by transmitter 200 of central terminal 10 in overhead channel 224 of frame information signal 218 over downlink signal 212. Receiver 202 of subscriber terminal 20 receives downlink signal 212 and extracts power control signal 236 therefrom. Power control signal 236 is provided to transmitter 204 of subscriber terminal 20 and incrementally adjusts the transmitting power of transmitter 204. Central terminal 10 continues to incrementally adjust the transmitting power of transmitter 204 until the transmitting power falls within a desired threshold range as determined by receiver 206. Adjustments to the transmitting power initially occur in a coarse adjustment mode having one decibel increments until the transmitting power falls within the desired threshold range. Upon turning transmitter 204 on, the transmitting power is gradually ramped up in intensity through incremental adjustments in order to avoid interference of central terminal communications with other subscriber terminals.

After the transmitting power of transmitter 204 in subscriber terminal 20 reaches the desired threshold range, receiver 206 in central terminal 10 continues to monitor the amount of transmitting power from transmitter 204 for any changes resulting from power fluctuations, and variations in the path delay between central terminal 10 and subscriber terminal 20, et al. If the transmitting power falls below or exceeds the desired threshold range, central terminal 10 will send an appropriate power control signal 236 to increase or decrease the transmitting power of transmitter 204 as needed. At this point, adjustments made to return the transmitting power to the desired threshold range may occur in a fine adjustment mode having 0.1 decibel increments. Upon an interruption in the downlink or uplink communication paths, central terminal 10 may command transmitter 204 to return to a previous transmitting power level through recovery of parameters stored in a memory in subscriber terminal 20 in order to facilitate reestablishment of the appropriate communication path.

To fully establish the uplink communication path from subscriber terminal 20 to central terminal 10, transmitter 204 in subscriber terminal 20 should be synchronized to receiver 206 in central terminal 10. Central terminal 10 controls the synchronization of transmitter 204 through code synchronization signal 234 in overhead channel 224 of frame information signal 218. Code synchronization signal 234 incrementally adjusts a phase of the slave code sequence of transmitter 204 to match the phase of the master code sequence of receiver 206. Synchronization of transmitter 204 is performed in a substantially similar manner as synchronization of receiver 202.

Code synchronization signal 234 is transmitted by transmitter 200 in central terminal 10 in overhead channel 224 of frame information signal 218 over downlink signal 212. Receiver 202 of subscriber terminal 20 receives downlink signal 212 and extracts code synchronization signal 234 therefrom. Code synchronization signal 234 is provided to transmitter 204 for incrementally adjustment of the phase of the slave code sequence of transmitter 204. Central terminal 10 continues to incrementally adjust the phase of the slave code sequence of transmitter 204 until receiver 206 recognizes a code and phase match between the slave code sequence of transmitter 204 and the master code sequence of central terminal 10.

Receiver 206 performs the same power measurement technique in determining a phase and code match for transmitter 204 synchronization as performed for receiver 202 synchronization. Adjustments to the phase of the slave code sequence of transmitter 204 initially occur in a coarse adjustment mode having one half of a chip rate increments until receiver 206 identifies the maximum power position of the combined power of the master code sequence and the slave code sequence of transmitter 204.

After identification and verification of a phase and code match of the slave code sequence to the master code sequence, receiver 206 continues to monitor uplink signal 214 for changes in the phase of the slave code sequence of transmitter 204 resulting from variations in the path delay between central terminal 10 and subscriber terminal 20. If further adjustments are needed to the phase of the slave code sequence of transmitter 204, central terminal 10 will send appropriate code synchronization signals 234 to increase or decrease the phase of the slave code sequence of transmitter 204 as needed. At this point, adjustments made to the phase of the slave code sequence of transmitter 204 may occur in a fine adjustment mode having one sixteenth of a chip rate increments. Upon an interruption in the downlink or uplink communication paths, central terminal 10 may command transmitter 204 to return to a previous slave code sequence phase value through recovery of parameters stored in a memory in subscriber terminal 20 in order to facilitate reestablishment of the appropriate communication path.

After synchronization of transmitter 204 is achieved, receiver 206 performs frame alignment on uplink signal 214 in a similar manner as frame alignment is performed by receiver 202 during establishment of the downlink communication path. A frame alignment circuit corresponding to that of FIG. 15 for checking for frame alignment in an uplink signal 214 (as opposed to a downlink signal 212) is provided in the central terminal. The operation of the frame alignment circuit in the central terminal is substantially the same as that described with reference to FIGS. 15 and 16. Once receiver 206 recognizes two successive frame alignment words and obtains frame alignment, the uplink communication path has been established. Upon establishing both the downlink and the uplink communication paths, information transfer between first user 208 or second user 210 of subscriber terminal 20 and users coupled to central terminal 10 may commence.

Wireless telecommunication system 1 is capable of adjusting the transmitting power level and the transmit rate to one of two settings for each of three different system operating modes. The system operating modes are acquisition, standby and traffic. Adjustments in the transmitting power and the transmit rate make it possible to reduce and minimize interference with other subscriber terminals. Improvements in link establishment time are also achieved. The transmitting power level is decoded in power control signal 236 and the transmit rate is decoded in code synchronization signal 234.

The transmitting power for both downlink signal 212 and uplink signal 214 can be set to either a nominal 0 decibel high power level or a reduced −12 decibel low power level. The transmit rate for both downlink signal 212 and uplink signal 214 can be set to a low rate of 10 kilobits per second or a high rate of 160 kilobits per second. When switched to the high rate of 160 kilobits per second, user traffic and overhead information are spread such that one information symbol results in the transmission of 16 chips. Correlation is performed over 16 chips, yielding a processing gain of 12 decibels. When switched to the low rate of 10 kilobits per second, only overhead information is spread such that one overhead symbol results in the transmission of 256 chips. Correlation is performed over 256 chips, yielding a processing gain of 24 decibels.

Figure 17:
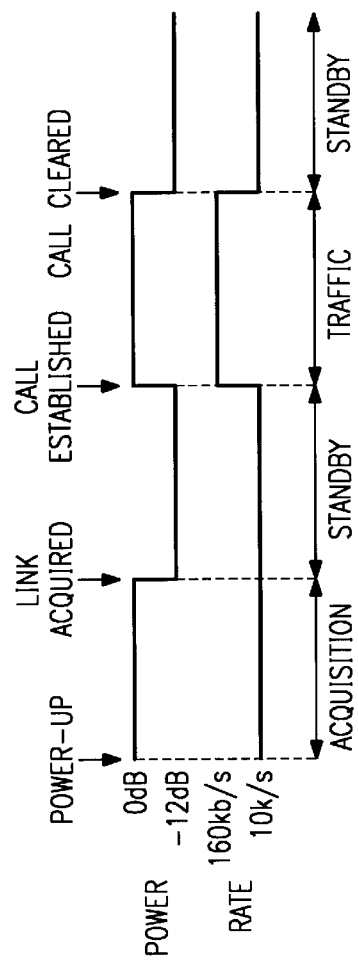
FIG. 17 is a graphical depiction of a transmitting power and a transmit rate for each mode of operation of the wireless telecommunications system.

FIG. 17 show the transmitting power and transmit rate for each of the three system operating modes. At power up or whenever the downlink or uplink communication paths are lost, wireless telecommunication system 1 enters the acquisition mode. During the acquisition mode, the transmitting power of the downlink and uplink transmitters are maximized as well as the correlator processing gain. This maximizes the signal to noise ratio at the correlator output, increasing the amplitude of the correlation peak 219 for easier identification and minimal risk of false acquisition. Since only overhead information is needed in the acquisition mode, the transmit rate is at the low rate level of 10 kilobits per second.

When the downlink and the uplink communication paths are acquired, wireless telecommunication system 1 enters the standby mode. In the standby mode, the transmitting power of the downlink and uplink transmitters are reduced by 12 decibels. This reduction in transmitting power minimizes the interference to other subscriber terminals while still maintaining synchronization. The transmit rate remains at the low rate level to allow exchange of control information between central terminal 10 and subscriber terminal 20 over overhead channel 224.

When either an incoming or outgoing call is detected, a message is sent from the originating terminal to the destination terminal indicating that the downlink and uplink communication paths are required for the transmission of user traffic information. At this point, wireless telecommunication system 1 enters into the traffic mode. During the traffic mode, the transmitting power of both the downlink and uplink communication paths is increased to the high power level and the transmit rate is increased to the high rate level of 160 kilobits per second to facilitate information transfer between originating and destination terminals. Upon detection of call termination, a message is sent from the terminating terminal to the other terminal indicating that the downlink and uplink communication paths are no longer required. At this point, wireless telecommunication system 1 reenters the standby mode. Code synchronisation and frame alignment tracking is performed in both the standby mode and the traffic mode.

FIG. 18 is a detailed block diagram of receiver 202 and transmitter 204 in subscriber terminal 20. Receiver 202 receives downlink signal 212 at an RF receive interface 250. RF receive interface 250 separates the spread spectrum signal into I and Q signal components. RF receive interface 250 band pass filters each of the I and Q signal components by removing portions above approximately half of receiver 202 bandwidth of 3.5 MegaHertz. RF receive interface 250 low pass filters the I and Q signal components to reject image frequencies and prevent signal aliasing. The I and Q signal components are placed into digital format by an analog to digital converter 252. The sampling frequency of analog to digital converter 252 is four times the chip period, or 10.24 MegaHertz, with an eight bit resolution.

The digital I and Q signal components are stepped to a rate of 5.12 MegaHertz by a down converter 254. A code generator and despreader 256 performs the synchronization acquisition and tracking functions previously described to synchronize the phase of the Rademacher-Walsh and pseudo-random noise code sequence of receiver 202 to that of downlink signal 212. A digital signal processor 258 controls the phase of the slave code sequence through a code tracker 260 and a carrier tracker 262. An automatic gain control unit 264 produces an automatic gain control signal to control the gain of RF receive interface 250. Code generator and despreader 256 generates the I and Q 160 kilobits per second of frame information for further synchronization by a node sync interface 266 under the control of a node sync logic unit 268. Node sync interface 266, through node sync logic unit 268, determines whether the I and Q channels should be swapped, as they may be received in four different ways.

Viterbi decoder 270 provides forward error correction on the I and Q channels and generates an error corrected 160 kilobits per second data signal after a 71 symbol delay. The error corrected signal is processed by a frame aligner and extractor 272 determines frame alignment and extracts power control signal 236, code synchronization 234, and operations and maintenance channel signal 238. Frame aligner and extractor 272 also extracts first user channel 226 and second user channel 228 for traffic transmission towards first user 208 an second user 210, and signalling channel 230 for processing by high level data link controller 274 and a microcontroller 276. Frame aligner and extractor 272 also provides alarm and error indications upon detecting a loss in frame alignment. A non-volatile random access memory 278 stores system parameter information for subsequent insertion through an arbitrator 280 in the event of link loss in order to facilitate link reestablishment. Arbitrator 280 also provides an interface between digital signal processor 258 and microcontroller 276.

In the transmit direction, a frame inserter 282 receives first user traffic and second user traffic from first user 208 and second user 210, signalling channel 230 information from high level data link controller 274, and operations and maintenance channel 238 information from microcontroller 276. Frame inserter generates frame information signal 218 for uplink signal 214 for processing by a convolutional encoder 284. Convolutional encoder 284 doubles the data rate of frame information signal 218 to provide forward error correction. A spreader 286 splits the 320 kilobits per second signal of convolutional encoder 284 into two 160 kilobits per second I and Q signals and exclusively ORs these signals with the spreading sequence generated by a code generator 288 in response to a system clock generated by clock generator 290 as adjusted by code synchronization signal 234. Code generator 288 generates one of sixteen Rademacher-Walsh functions exclusive ORed with a pseudo-random sequence having a pattern length of 256 with a chip rate of 2.56 MegaHertz. The pseudo-random sequence should match that of central terminal 10, but is adjustable under software control to provide reliable rejection of signals from other bands or other cells.

Spreader 286 supplies the I and Q signals to an analog transmitter 290. Analog transmitter 290 produces pulsed I and Q signals for an RF transmit interface 292. Transmit power is generated by first establishing a control voltage from a digital to analog converter in response to power control signal 236 extracted from overhead channel 224. This control voltage is applied to the power control inputs of analog transmitter 290 and RF transmit interface 292. Power control of 35 decibels is obtainable in both analog transmitter 290 and RF transmit interface 292. RF transmit interface 292 includes a step attenuator that provides 2 decibel steps of attenuation over a 30 decibel range. This attenuator is used to switch between high and low power levels. On power up, maximum attenuation is selected to minimize the transmitting power of transmitter 204.

Thus, it is apparent that there has been provided, in accordance with the present invention, an apparatus and method of synchronizing a transmitter in a subscriber terminal of a wireless telecommunications system. Although the preferred embodiment has been described in detail, it should be understood that various changes, substitutions, and alterations can be made herein. For example, though the downlink and uplink signals have been described with a specific format and rate, other formats and rates may be implemented while providing a similar transmission of status, control, and information. Thus, although a particular embodiment has been described herein, it will be appreciated that the invention is not limited thereto and that many modifications and additions thereto may be made within the scope of the invention.

What is claimed is:

1. Apparatus for frame aligning information at a station of a wireless telecommunications system, said apparatus comprising:

a plurality of shift registers arranged in parallel to sample data symbols from a wireless communications signal, said wireless communications signal including a control channel, successive bits of the control channel being encoded at every mth bit position of said wireless communications signal;

a strobe generator for generating respective clock strobes for each of said shift registers at a control channel rate of said wireless communications signal such that each register, in use, samples every mth data symbol at a respective sample timing in a predetermined timing relationship such that different data symbols are sampled by each shift register; and frame alignment logic arranged to monitor said shift registers in parallel to identify a received frame alignment word formed from successive sampled data symbols in a said shift register for identifying a correct frame alignment for said received wireless communications signal.

2. Apparatus according to claim 1, wherein said frame alignment logic comprises comparator logic arranged separately to compare said sampled data symbols in each of said shift registers to a frame alignment word stored in a frame alignment word register.

3. Apparatus according to claim 2, wherein said comparator logic outputs a match signal for a shift register when its contents match said stored frame alignment word.

4. Apparatus according to claim 3, wherein said frame alignment logic comprises a state machine for controlling said strobe generator, said state machine being responsive to match signals from said comparator logic.

5. Apparatus according to claim 4, wherein a first one of said shift registers forms a primary shift register with remaining ones of said shift registers forming secondary shift registers, and said state machine is operable to respond to a first match signal for any of said secondary shift registers during a predetermined period to adjust sample timings of said primary shift register for a subsequent predetermined period to correspond to that of said one of said secondary shift registers and to adjust sample timings of said secondary shift registers in accordance with said predetermined timing relationship.

6. Apparatus according to claim 5, wherein said predetermined period is a period corresponding to that for receipt of a frame of information.

7. Apparatus according to claim 6, wherein said frame alignment logic is operable, following identification of a received frame alignment word in one frame period, to verify said frame alignment during a subsequent frame period.

8. Apparatus according to claim 4, wherein a first one of said shift registers forms a primary shift register with remaining ones of said shift registers forming secondary shift registers, and said state machine is operable to respond to a timing of a match to set sample timings of said primary shift register for a subsequent predetermined period to correspond to that of said match timing and to set sample timings of said secondary shift registers in accordance with said predetermined timing relationship.

9. Apparatus according to claim 4, wherein said state machine is operable to respond to an absence of a match signal during a given predetermined period to shift said sample timings of said shift registers for a subsequent predetermined period by a single data symbol timing.

10. Apparatus according to claim 2, wherein said comparator logic compares said sampled data symbols in each of said registers to an inversion of said stored frame alignment word and outputs a second match signal for a shift register when its content matches said inverted frame alignment word.

11. Apparatus according to claim 1, wherein said frame alignment logic continuously monitors said received communications signal for received frame alignment words, said apparatus re-identifying two successive received frame alignment words in response to an interruption of said communication signal or on receiving four successive frames of information without detecting a frame alignment word.

12. Apparatus according to claim 1, wherein said predetermined timing relationship is i, i+2P, i+4P, i+6P, etc, for primary and successive secondary shift registers respectively, where i is a first timing for said primary shift register, and P is a data symbol period, whereby alternate data symbols of said wireless communications signal are monitored.

13. Apparatus according to claim 1, wherein said control channel is an overhead channel of said wireless communications signal, successive bits of said overhead channel being encoded at every mth bit position of said wireless communications signal.

14. Apparatus according to claim 13, wherein m/2 shift registers are provided.

15. Apparatus according to claim 1, wherein said frame alignment word and each shift register each comprise n bits.

16. A receiver for a station of a wireless telecommunications system comprising the apparatus according to claim 1.

17. A system for frame aligning information in a wireless telecommunications system, comprising:
 a transmitter in a central station operable to transmit a downlink signal, said downlink signal including a frame alignment word for each frame of information carried by said downlink signal; and
 a receiver in a subscriber station operable to receive said downlink signal, said receiver including:
  a plurality of shift registers arranged in parallel to sample data symbols from a wireless communications signal, said wireless communications signal including a control channel, successive bits of the control channel being encoded at every mth bit position of said wireless communications signal;
  a strobe generator for generating respective clock strobes for each of said shift registers at a control channel rate of said wireless communications signal such that each register, in use, samples every mth data symbol at a respective sample timing in a predetermined timing relationship such that different data symbols are sampled by each shift register; and
  frame alignment logic arranged to monitor said shift registers in parallel to identify a received frame alignment word formed from successive sampled data symbols in a said shift register for identifying a correct frame alignment for said received wireless communications signal;
 wherein said receiver is operable to identify two successive frame alignment words in said downlink signal, said receiver being operable to establish a downlink communication path from said transmitter in said central station to said receiver in said subscriber station upon identifying two successive frame alignment words.

18. A subscriber station of a wireless telecommunications system comprising a receiver according to claim 17.

19. A central station of a wireless telecommunications system comprising a receiver according to claim 17.

20. A system for frame aligning information in a wireless telecommunications system, comprising:
 a transmitter in a subscriber station operable to transmit an uplink signal, said uplink signal including a frame alignment word for each frame of information carried by said uplink signal; and
 a receiver in a central station operable to receive said uplink signal, said receiver including:
  a plurality of shift registers arranged in parallel to sample data symbols from a wireless communications signal, said wireless communications signal including a control channel, successive bits of the control channel being encoded at every mth bit position of said wireless communications signal;
  a strobe generator for generating respective clock strobes for each of said shift registers at a control channel rate of said wireless communications signal such that each register, in use, samples every mth data symbol at a respective sample timing in a predetermined timing relationship such that different data symbols are sampled by each shift register; and frame alignment logic arranged to monitor said shift registers in parallel to identify a received frame alignment word formed from successive sampled data symbols in a said shift register for identifying a correct frame alignment for said received wireless communications signal;

wherein said receiver is operable to identify two successive frame alignment words in said uplink signal, said receiver being operable to establish an uplink communication path from said transmitter in said subscriber station to said receiver in said central station upon identifying two successive frame alignment words.

21. A method of aligning information in a wireless telecommunications system, comprising the steps of:

receiving a wireless communications signal at a second station of said wireless telecommunications system, said wireless communications signal being transmitted from a first station of said wireless communications system, said wireless communications signal including a control channel, successive bits of the control channel being encoded at every mth bit position of said wireless communications signal;

sampling, in parallel in a plurality of shift registers, selected data symbols from said received wireless telecommunications signal, each shift register sampling every mth data symbol at a respective sample timing in a predetermined timing relationship such that different data symbols are sampled by each register; and monitoring said shift registers in parallel to identify a received frame alignment word formed from successive sampled data symbols in a said shift register for establishing a correct frame alignment for said received wireless communications signal.

22. A method according to claim 21, comprising separately comparing said sampled data symbols in each of said shift registers to a frame alignment word stored in a frame alignment word register.

23. A method according to claim 22, comprising generating a match signal for a shift register where its content matches said stored frame alignment word.

24. A method according to claim 23, comprising controlling said strobe generator in response to match signals from said comparator logic.

25. A method according to claim 24, wherein a first one of said shift registers forms a primary shift register with remaining ones of said shift registers forming secondary shift registers, said method comprising responding to a first match signal for any of said secondary shift registers during a given predetermined period to adjust sample timings of said primary shift register for a subsequent predetermined period to correspond to that of said one of said secondary shift registers and to adjust sample timings of said secondary shift registers in accordance with said predetermined timing relationship.

26. A method according to claim 24, wherein a first one of said shift registers forms a primary shift register with remaining ones of said shift registers forming secondary shift registers, said method comprising responding to a timing of a match to set sample timings of said primary shift register for a subsequent predetermined period to correspond to that of said match timing and to set sample timings of said secondary shift registers in accordance with said predetermined timing relationship.

27. A method according to claim 24, comprising responding to an absence of a match signal during a given predetermined period to shift said sample timings of said shift registers for a subsequent predetermined period by a single data symbol timing.

28. A method according to claim 24, wherein said predetermined period is a period corresponding to that for receipt of a frame of information.

29. A method according to claim 28, comprising following identification of a received frame alignment word in one frame period, verifying said frame alignment during a subsequent frame period.

30. A method according to claim 22, comprising comparing said sampled data symbols in each of said registers to an inversion of said stored frame alignment word and outputting a second match signal for a shift register when its content matches said inverted frame alignment word.

31. A method according to claim 21, comprising continuously monitoring said received communications signal for frame alignment words, and re-identifying two successive frame alignment words in response to an interruption of the communication signal or on receiving four successive frames of information without detecting a frame alignment word.

32. A method according to claim 21, wherein said predetermined timing relationship is i, i+2P, i+4P, i+6P, etc, for primary and successive secondary shift registers respectively, where i is a first timing for said primary shift register, and P is a data symbol period, whereby alternate data symbols of said wireless communications signal are monitored.

33. A method according to claim 21, wherein said control channel is an overhead channel of said wireless communications signal, successive bits of said overhead channel being encoded at every mth bit position of said wireless communications signal.

* * * * *